US007929760B2

(12) United States Patent
Tamagawa

(10) Patent No.: US 7,929,760 B2
(45) Date of Patent: Apr. 19, 2011

(54) COLOR PROCESSING METHOD AND APPARATUS BASED ON VIEWING CONDITION

(75) Inventor: Kei Tamagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1054 days.

(21) Appl. No.: 11/694,163

(22) Filed: Mar. 30, 2007

(65) Prior Publication Data

US 2007/0230777 A1  Oct. 4, 2007

(30) Foreign Application Priority Data

Mar. 31, 2006  (JP) ................................. 2006-100387

(51) Int. Cl.
G06K 9/00 (2006.01)
G03F 3/08 (2006.01)
G06K 9/34 (2006.01)

(52) U.S. Cl. ....................................... 382/167; 358/518

(58) Field of Classification Search .................. 382/162, 382/164, 167; 358/1.9, 3.2, 502, 515, 518, 358/523, 530, 537; 345/204, 207, 589, 590, 345/593, 594, 597, 600–604; 348/243, 253
See application file for complete search history.

(56) References Cited

U.S. PATENT DOCUMENTS

| 5,510,910 | A | * | 4/1996 | Bockman et al. | ............. 358/502 |
| 5,608,549 | A | | 3/1997 | Usami | |
| 5,734,745 | A | * | 3/1998 | Ohneda | ......................... 382/167 |
| 6,043,909 | A | * | 3/2000 | Holub | ............................ 358/504 |
| 6,157,735 | A | * | 12/2000 | Holub | ............................ 382/167 |
| 6,459,425 | B1 | * | 10/2002 | Holub et al. | ................... 345/207 |
| 6,480,299 | B1 | * | 11/2002 | Drakopoulos et al. | ......... 358/1.9 |
| 6,603,483 | B1 | * | 8/2003 | Newman | ......................... 345/593 |
| 6,956,581 | B2 | * | 10/2005 | Cui et al. | ....................... 345/589 |
| 7,046,393 | B2 | * | 5/2006 | Zeng | ............................... 358/1.9 |
| 2004/0057614 | A1 | | 3/2004 | Ogatsu et al. | |
| 2007/0230777 | A1 | * | 10/2007 | Tamagawa | ..................... 382/162 |

FOREIGN PATENT DOCUMENTS

| JP | 04-362869 A | 12/1992 |
| JP | 06-121159 A | 4/1994 |
| JP | 2004-112694 A | 4/2004 |

* cited by examiner

Primary Examiner — Amir Alavi
(74) Attorney, Agent, or Firm — Canon U.S.A., Inc., I.P. Division

(57) ABSTRACT

Input and output gamut data of input and output devices and a viewing condition are input. The color values of a specific color and target values of the specific color on a color appearance space are obtained. Using a color processing coefficient required to convert the color values of the specific color into the target values, color processing is applied to image data input from the input device, and the image data that has undergone the color processing is output to the output device.

6 Claims, 24 Drawing Sheets

FIG. 7

| INDEX | R | G | B | J | a | b |
|---|---|---|---|---|---|---|
| 1 | 0 | 0 | 0 | ##.# | ##.# | ##.# |
| 2 | 0 | 0 | 32 | ##.# | ##.# | ##.# |
| ⋮ | ⋮ | ⋮ | ⋮ | ⋮ | ⋮ | ⋮ |
| 728 | 255 | 255 | 224 | ##.# | ##.# | ##.# |
| 729 | 255 | 255 | 255 | ##.# | ##.# | ##.# |

FIG. 8

| LIGHT SOURCE NAME | A | D50 | ...... |
|---|---|---|---|
| LIGHT SOURCE NUMBER | 1 | 2 | ...... |

FIG. 10

| INDEX | SPECIFIC COLOR | | | TARGET COLOR | | | | | | | | | |
|---|---|---|---|---|---|---|---|---|---|---|---|---|---|
| | | | | LIGHT SOURCE NUMBER 1 | | | LIGHT SOURCE NUMBER 2 | | | ... | LIGHT SOURCE NUMBER Nw | | |
| | R | G | B | J | a | b | J | a | b | ... | J | a | b |
| 1 | ⋮ | ⋮ | ⋮ | ⋮ | ⋮ | ⋮ | ⋮ | ⋮ | ⋮ | ⋮ | ⋮ | ⋮ | ⋮ |
| 2 | ⋮ | ⋮ | ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ | ⋮ | ⋮ | ⋮ |
| Np | ⋮ | ⋮ | ⋮ | ⋮ | ⋮ | ⋮ | ⋮ | ⋮ | ⋮ | ⋮ | ⋮ | ⋮ | ⋮ |

FIG. 17

| INTENSITY OF ILLUMINATION [lx] \ LIGHT SOURCE NAME | A | D50 | ...... |
|---|---|---|---|
| 100 | 1 | 2 | ...... |
| 200 | ...... | ...... | ...... |
| ...... | ...... | ...... | ...... |

FIG. 20

| INDEX | SPECIFIC COLOR | | | TARGET COLOR | | | | | | | | | | | | | |
|---|---|---|---|---|---|---|---|---|---|---|---|---|---|---|---|---|---|
| | | | | LIGHT SOURCE 1 | | | | | | ... | LIGHT SOURCE Nw | | | | | | |
| | | | | INTENSITY OF ILLUMINATION 1 | | | INTENSITY OF ILLUMINATION 2 | | | ... | INTENSITY OF ILLUMINATION 1 | | | INTENSITY OF ILLUMINATION 2 | | | ... |
| | R | G | B | J | a | b | J | a | b | ... | J | a | b | J | a | b | ... |
| 1 | ... | ... | ... | ... | ... | ... | ... | ... | ... | ... | ... | ... | ... | ... | ... | ... | ... |
| 2 | ... | ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... | ... | ... |
| Np | ... | ... | ... | ... | ... | ... | ... | ... | ... | ... | ... | ... | ... | ... | ... | ... | ... |

Ps : SPECIFIC COLOR
Pd : TARGET COLOR
Pig : GRID POINT
R : CORRECTION RANGE

COLOR PROCESSING METHOD AND APPARATUS BASED ON VIEWING CONDITION

BACKGROUND OF THE INVENTION

1. Field of the Invention

The present invention relates to color processing according to the viewing condition.

2. Description of the Related Art

In recent years, opportunities to print images obtained by digital cameras and scanners using printers are increasing. In general, the color space of image data output from such digital cameras and scanners is sRGB, AdobeRGB, or the like.

FIG. 1 is an xy chromaticity diagram showing the color gamuts of sRGB and AdobeRGB. A triangular region Rs shown in FIG. 1 is the color gamut of sRGB, a triangular region Ra including Rs is that of AdobeRGB, a horseshoe region Rv is that of a human visible range, and a region Rp is that of a representative printer. The sRGB color gamut Rs and printer color gamut Rp, or the AdobeRGB color gamut Ra and printer color gamut Rp are different from each other. For this reason, upon outputting sRGB image data to the printer, processing (gamut mapping) for associating sRGB color signal values to those of the printer so as to correct the color gamut difference is required.

FIG. 2 is a flowchart of general gamut mapping. Note that the following description will be given taking sRGB as an example of an input color space.

Jab values of a color appearance space corresponding to pixel values RGB of an sRGB image are calculated (S41). As the color appearance space, for example, CIELAB, CIECAM97s, CIECAM02, and the like are available. In the following description, assume that Jab values represent color values of CIECAM02.

The Jab values are mapped on the color gamut of an output device within the color appearance space (S42). J'a'b' values after mapping are converted into device RGB values (R'G'B' values) of the output device (S43). The gamut mapping implements calorimetric mapping that preserves values within an output gamut and maps values outside the output gamut on the boundary surfaces of the output gamut. Alternatively, perceptual mapping that maps on favorable colors while preserving tones may be executed.

According to the perceptual mapping, reproduction targets are set for specific colors such as memory colors including, e.g., flesh color, sky blue, and the like, and the gamut mapping is executed to convert the specific colors into target colors, thus realizing favorable color reproduction after mapping. As a technique for reproducing specific colors by target colors, for example, a technique disclosed in Japanese Patent Laid-Open No. 4-362869 is known. With this technique, mapping parameters are set in advance so that color differences between the specific colors and target colors fall within a certain range, and colors other than the specific colors are mapped on a specific color space to have smooth color variations. Also, Japanese Patent Laid-Open No. 6-121159 discloses a technique for mapping input color values on the output gamut while maintaining tones and correcting the specific colors to the target colors in association with the color values after mapping.

The technique of Japanese Patent Laid-Open No. 4-362869 calculates a maximum likelihood solution of masking coefficients which make the specific colors after color conversion match the target colors, and converts the pixel values of an image using the masking coefficients which meet the maximum likelihood solution into output device values.

On the other hand, the technique of Japanese Patent Laid-Open No. 6-121159 assures a region (correction range) that includes specific colors to map the specific colors, and linearly maps color values within the correction range upon reproducing the specific colors using the target colors, thus maintaining tonality between the specific colors and surrounding colors.

A technique disclosed in Japanese Patent Laid-Open No. 2004-112694 assures a region (correction range) that includes specific colors and target colors, and corrects surrounding colors in accordance with distances from the specific colors and target colors.

Meanwhile, output images of printers and the like are viewed in various locations. For this reason, a given image is often viewed under a pale fluorescent lamp of about 4200K which is popularly used at home, and is also often viewed under a red-yellow incandescent lamp of about 3000K. In such case, the viewer perceives quite different colors. Furthermore, the vision of an image differs depending on the intensity of illumination, colors around the image, the ratio between the adaptation luminance and background luminance upon viewing, and the like. In other words, even when the target colors are corrected to correct the colors of an image to be viewed as favorable colors under the light source of 4200K, if such image is viewed under the light source of 3000K, the target colors are not perceived as favorable colors. That is, unless suited target colors are set for respective viewing conditions, and an image undergoes color correction by switching the target colors for respective viewing conditions, the target colors are never perceived as favorable colors under respective conditions.

In this manner, the target colors must be switched for respective viewing conditions upon execution of gamut mapping. However, the aforementioned techniques do not consider viewing of an image under various viewing conditions.

SUMMARY OF THE INVENTION

In one aspect, the present invention inputs information indicating a viewing condition, an input gamut of an input device, and an output gamut of an output device, obtains a color value of a specific color and a target value of the specific color on a color appearance space corresponding to the viewing condition from a table corresponding to the input gamut and the output gamut, sets a color processing coefficient required to convert the color value of the specific color into the target value, applies color processing to image data input from the input device using the color processing coefficient, and outputs the image data that has undergone the color processing to the output device.

In another aspect, the present invention inputs a viewing condition, obtains a color value of a specific color and a target value of the specific color on a color appearance space corresponding to the viewing condition from a target value table corresponding to a color conversion table, sets a correction range based on a converted value obtained by converting the color value of the specific color onto the color appearance space, and the target value, and applies color correction to a value of a grid point of the color conversion table on the color appearance space, which value falls within the correction range, based on the converted value and the target value.

According to each of the aspects, color processing can switch target colors for respective viewing conditions. Therefore, the target colors can be set according to a certain viewing condition, and favorable color reproduction can be realized under that viewing condition.

Further features of the present invention will become apparent from the following description of exemplary embodiments with reference to the attached drawings.

BRIEF DESCRIPTION OF THE DRAWINGS

FIG. 7 shows a format example of gamut data;

FIG. 8 shows a correspondence table of light source names and corresponding light source numbers;

FIG. 10 shows an example of a target color table;

FIG. 17 shows a correspondence table of light source names and corresponding light source numbers, which table is held by a viewing condition obtaining unit;

FIG. 20 shows an example of a target value table;

DESCRIPTION OF THE EMBODIMENTS

Color processing according to exemplary embodiments of the present invention will be described in detail hereinafter with reference to the accompanying drawings.

First Embodiment

[Arrangement of Color Conversion Apparatus]

Figure 3:
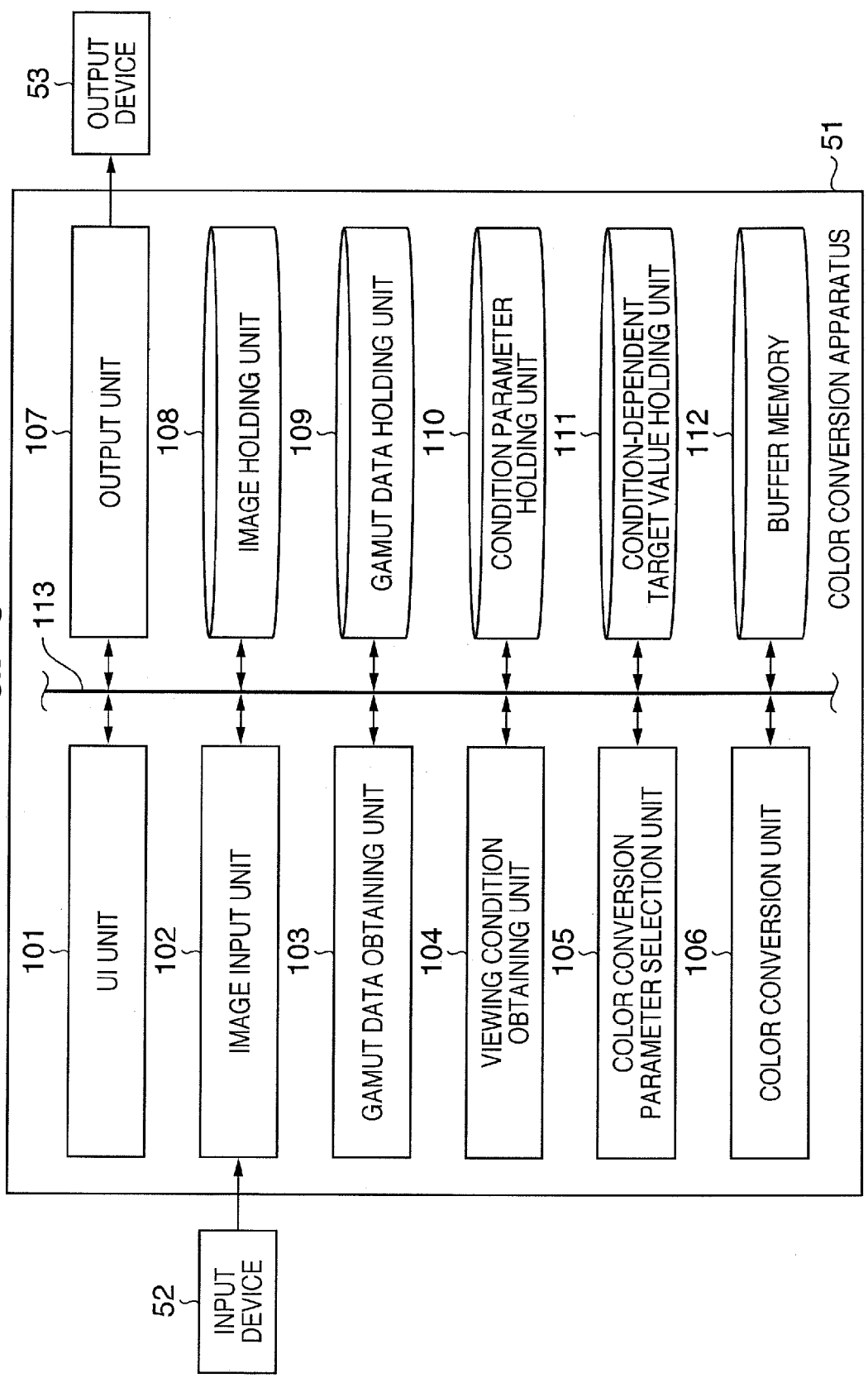
FIG. 3 is a block diagram showing an exemplary arrangement of a color conversion apparatus.

FIG. 3 is a block diagram showing an arrangement of a color conversion apparatus 51 of the first exemplary embodiment.

A user interface (UI) unit 101 inputs user's instructions. An image input unit 102 inputs image data from an input device 52, and stores the input image data in an image holding unit 108. A gamut data obtaining unit 103 obtains gamut data indicating the color gamut of the input device 52 and that of an output device 53 from a gamut data holding unit 109. A viewing condition obtaining unit 104 obtains a viewing condition of an output image, and stores it in a condition parameter holding unit 110. A color conversion parameter selection unit 105 selects target colors according to the current viewing condition from those for respective viewing conditions, which are held in a condition-dependent target color holding unit 111. A color conversion unit 106 executes gamut mapping of pixel values of image data based on the selected target colors. An output unit 107 outputs image data after gamut mapping to the output device 53.

A buffer memory 112 temporarily holds data in the middle of arithmetic operations, and may include a high-speed memory such as a random access memory (RAM) or the like, together with the image holding unit 108. The gamut data holding unit 109, condition parameter holding unit 110, and condition-dependent target color holding unit 111 may be assigned to respective areas on a nonvolatile hard disk. The image holding unit 108 and buffer memory 112 may also be assigned to the hard disk.

The aforementioned units are connected to each other via a system bus 113. The input device 52 is a device such as a digital still camera, digital video camera, image scanner, film scanner, or the like, which inputs, captures, or scans an image. The output device 53 is a device such as a monitor, projector, printer, film recorder, or the like, which outputs, displays, or records an image. A reader in which a memory card that saves (or can save) image data is inserted or a hard disk drive may be connected in place of the input and output devices 52 and 53. These devices and the color conversion apparatus 51 are connected via a network or a general-purpose interface (e.g., USB (Universal Serial Bus) or IEEE1394).

Figure 4:
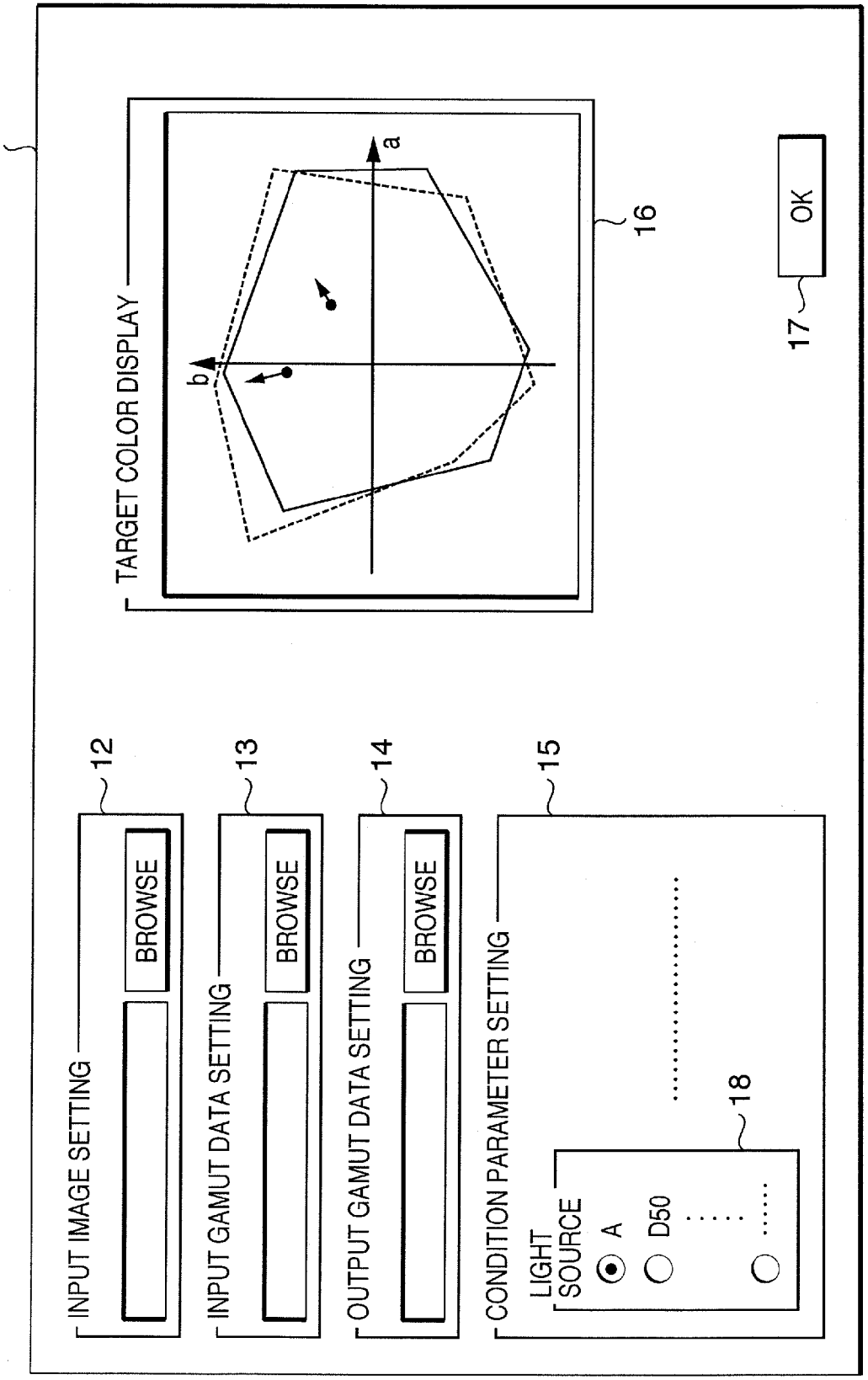
FIG. 4 shows an example of a user interface provided by a UI unit.

FIG. 4 shows an example of a user interface 11 provided by the UI unit 101.

The UI unit 101 displays a user interface exemplified in FIG. 4 on a monitor (not shown), and inputs instructions by the user who operates a keyboard and mouse (not shown).

The user sets a file name of input image data in an input image setting field 12, a file name of input gamut data in an input gamut data setting field 13, and a file name of output gamut data in an output gamut data setting field 14. Also, the user sets a condition parameter using a condition parameter setting area 15. The condition parameter setting area 15 in FIG. 4 is the example wherein the user selects a viewing light source of an output image using a light source selection area 18. The color conversion apparatus 51 displays target colors, input gamut, and output gamut in correspondence with the condition parameter set via the UI unit 101 on a target color display area 16. Upon completion of the settings, the user presses an OK button 17 to input a setting end message to the UI unit 101.

[Operation of Color Conversion Apparatus]

Figure 5:
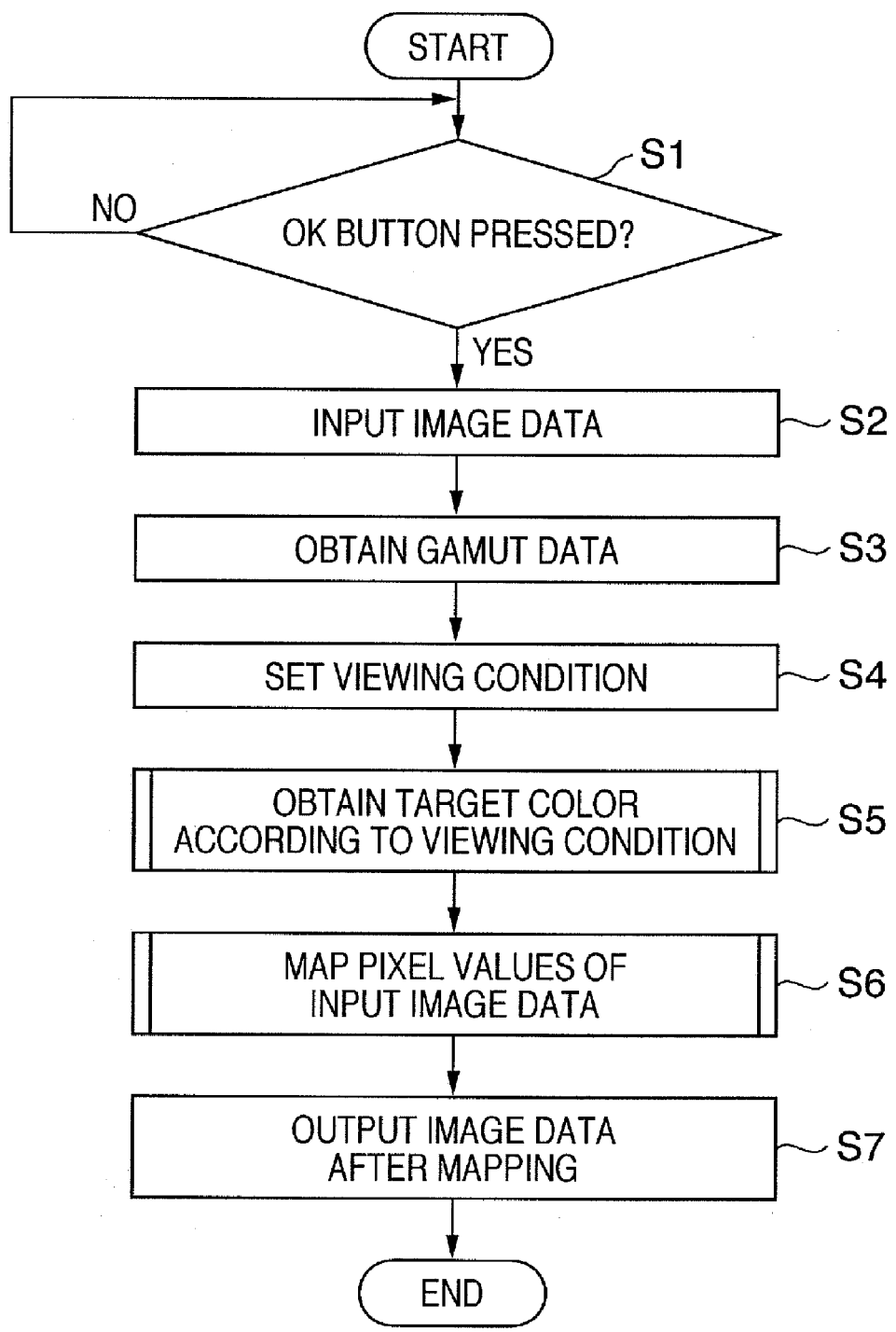
FIG. 5 is a flowchart showing color processing to be executed by the color conversion apparatus.

FIG. 5 is a flowchart showing color processing to be executed by the color conversion apparatus 51.

It is checked if the user has pressed the OK button 17 on the user interface 11 (S1). If the user has pressed the OK button 17 (YES in S1), the image input unit 102 inputs image data with the file name set in the input image setting field 12 from the input device 52, and stores the input image data in the image holding unit 108 (S2).

Figure 6:
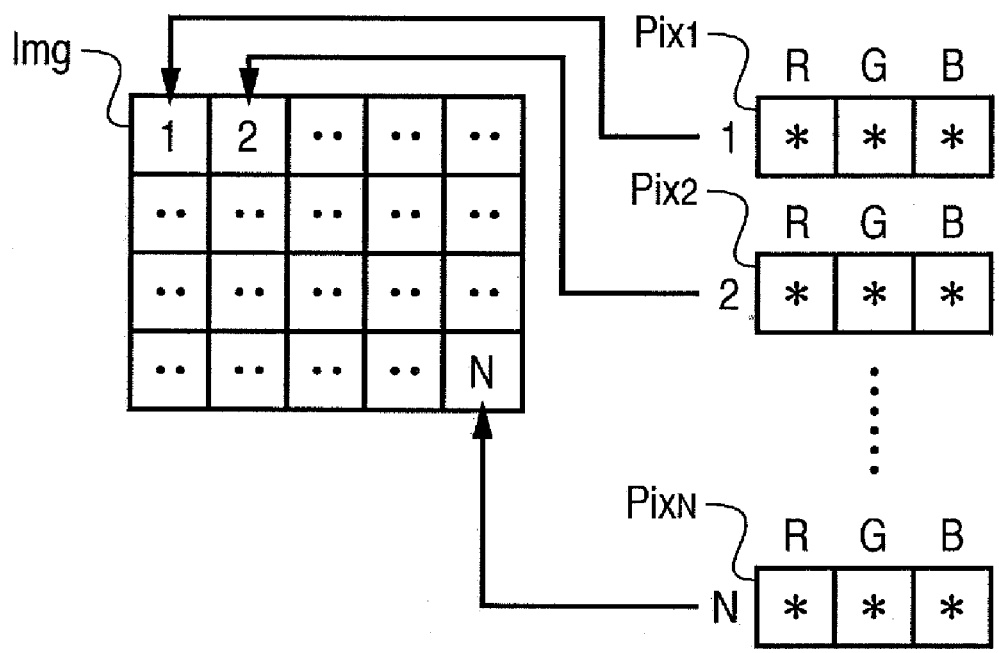
FIG. 6 shows the data format of an image to be stored in an image holding unit.

FIG. 6 shows the data format of an image stored in the image holding unit 108. A matrix Img stores a sequence of pixel values $Pix_1, Pix_2, \ldots, Pix_N$. The matrix Img stores pixel values in turn from the upper left of an image. Therefore, the pixel value of lower right pixel N of the image is stored at the end of the matrix Img. Each pixel value has an array of 1 row×3 columns, which respectively store R, G, and B values.

The gamut data obtaining unit 103 obtains input gamut data and output gamut data, which are set in the input gamut data setting field 13 and output gamut data setting field 14 (S3).

FIG. 7 shows a format example of gamut data, and is a correspondence table which describes pairs of device color signal values and corresponding color appearance space values. For example, gamut data of a printer is created as follows. The device RGB values of the printer are sliced into nine or 17. The RGB values of respective grid points are input to the printer to print color patches on a predetermined print sheet. A calorimeter measures the XYZ values of the color patches. The XYZ values of the colorimetry results are converted into Jab values by a conversion formula of CIECAM02. Pairs of the Jab values obtained in this way, and the device RGB values are stored as gamut data.

The viewing condition obtaining unit 104 sets the viewing condition of an output image corresponding to the viewing condition set on the condition parameter setting area 15 in the condition parameter holding unit 110 (S4). For example, the viewing condition obtaining unit 104 holds a correspondence table of light source names and corresponding light source numbers shown in FIG. 8. When the user selects D50, the viewing condition obtaining unit 104 stores light source number 2 corresponding to D50 in the condition parameter holding unit 110.

The color conversion parameter selection unit 105 obtains target colors corresponding to the input and output gamuts and the viewing condition (S5), as will be described in detail later. The color conversion unit 106 maps respective pixels of the image data stored in the image holding unit 108 on the color gamut of the output device 53 (S6), as will be described in detail later. That is, the color conversion unit 106 converts respective pixel values into device color values, and stores the converted device color values in the image holding unit 108. The output unit 107 outputs the image data of the device color values stored in the image holding unit 108 to the output device 53 (S7).

[Color Conversion Parameter Selection Unit]

Figure 9:
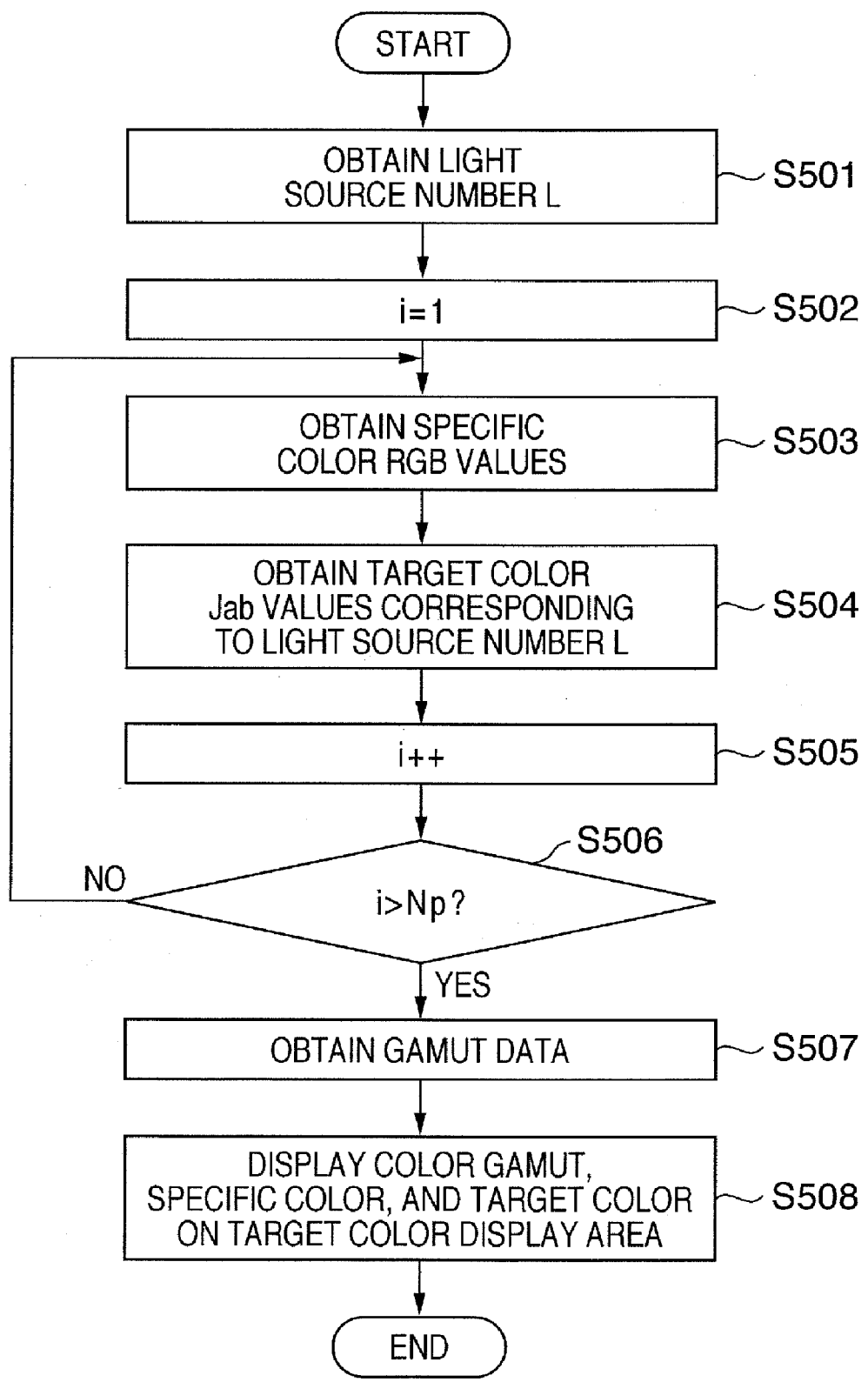
FIG. 9 is a flowchart showing processing of a color conversion parameter selection unit.

FIG. 9 is a flowchart showing processing (S5) of the color conversion parameter selection unit 105 for obtaining target color according to viewing conditions.

The color conversion parameter selection unit 105 obtains light source number L from the condition parameter holding unit 110 (S501), and resets counter i to "1" (S502). The color conversion parameter selection unit 105 obtains the RGB values of a specific color from a row with index number i of a target color table (to be described later) in the condition-dependent target color holding unit 111 (S503), and obtains the Jab values of a target color corresponding to light source number L (S504).

FIG. 10 shows an example of a target color table. An index number indicates the number of a specific color, and a maximum value Np of the index number corresponds to the number of specific colors. Each row of the target color table stores specific color RGB values and target color Jab values corresponding to the light source numbers. The target color table is stored in the condition-dependent target color holding unit 111 in correspondence with the input gamut and output gamut. Therefore, the color conversion parameter selection unit 105 selects a target color table corresponding to information indicating the color gamuts recorded in, e.g., the headers of the input gamut data and output gamut data, and obtains specific color RGB values and target color Jab values. The information of each of the input and output gamuts is not limited to that recorded in the header of each of the input and output gamut data. For example, such information may be directly obtained from the input and output devices 52 and 53 connected to the color conversion apparatus 51 or the user may select or set that information via the user interface 11 shown in FIG. 4. The target color table describes the color values of the boundary of the input gamut as specific colors, and mapping destinations of these color values as target colors, so as to prevent color values after color conversion by the color conversion unit 106 (to be described later) from falling outside the output gamut.

The color conversion parameter selection unit 105 then increments counter i (S505), and checks if the specific color RGB values and the target color Jab values corresponding to light source number L are obtained for all specific colors (S506). That is, the color conversion parameter selection unit 105 compares the value of counter i with the total number Np of specific colors. If i≦Np (NO in S506), the color conversion parameter selection unit 105 determines that specific colors to be obtained still remain, and the process returns to step S503. If i>Np (YES in S506), the color conversion parameter selection unit 105 determines that obtaining data associated with all specific colors is complete.

Upon completion of obtaining the data associated with all specific colors (YES in S506), the color conversion parameter selection unit 105 loads the input gamut data and output gamut data obtained in step S3 in FIG. 5 into the buffer memory 112 (S507). The color conversion parameter selection unit 105 then displays the input gamut, output gamut, specific colors, and target colors on the target color display area 16 of the user interface 11 based on the input gamut data, output gamut data, specific color RGB values, and target color Jab values (S508). In this case, Jab values of the specific colors are calculated from the specific color RGB values using tetrahedron interpolation, and its method will be described later.

[Color Conversion Unit]

Figure 11:
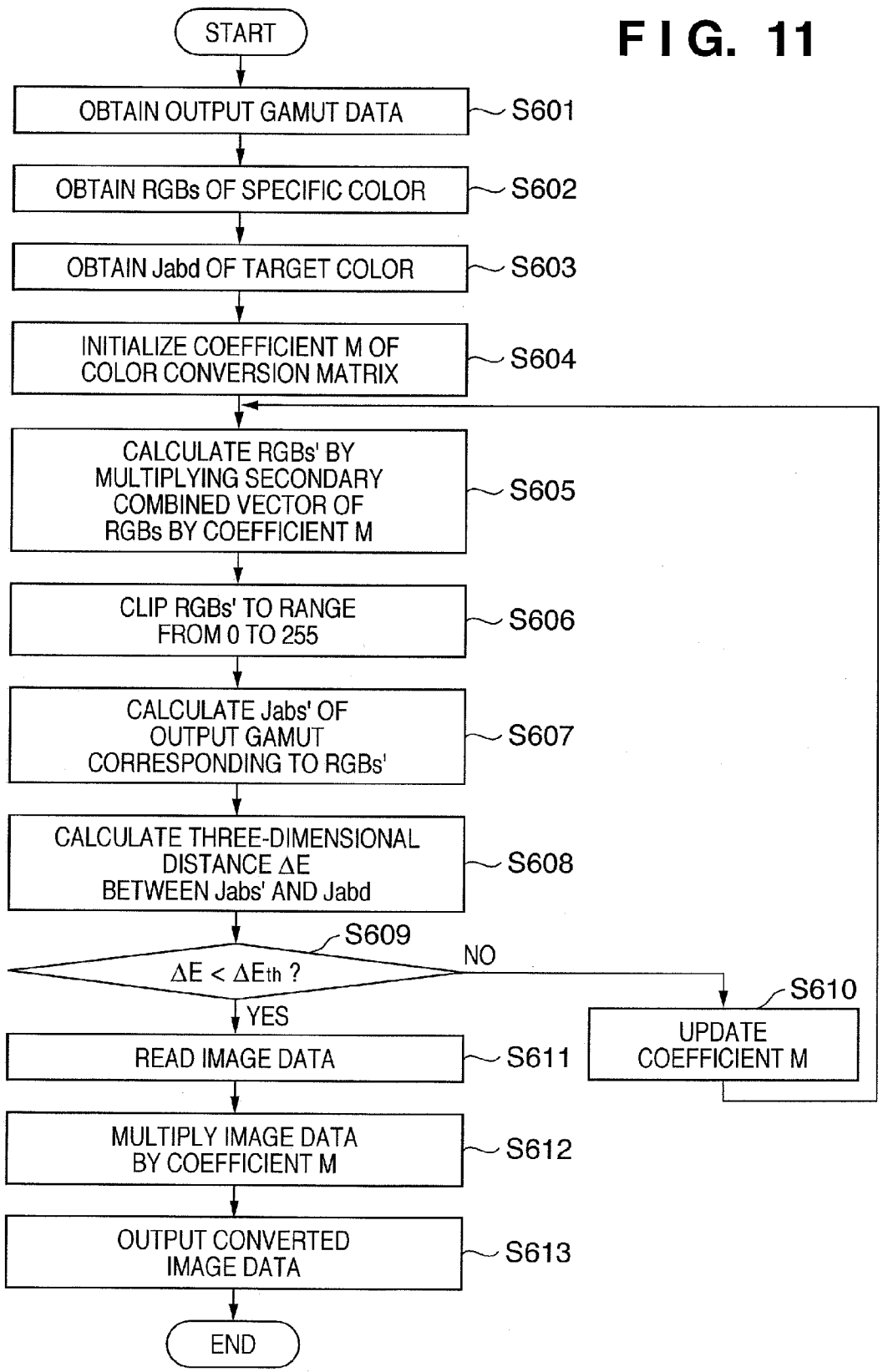
FIG. 11 is a flowchart showing processing of a color conversion unit.

FIG. 11 is a flowchart showing processing (S6) of the color conversion unit 106.

The color conversion unit 106 obtains the output gamut data from the gamut data holding unit 109 (S601), and obtains the specific color RGB values (to be referred to as "RGBs" hereinafter) obtained by the color conversion parameter selection unit 105 in step S5 in FIG. 5 (S602). The color conversion unit 106 implements color conversion by matrix operations. Since a two-dimensional matrix will be exemplified below, a coefficient M is expressed by a 3 (rows)×9 (columns) matrix given by:

$$M = \begin{bmatrix} a11 & a12 & a13 & a14 & a15 & a16 & a17 & a18 & a19 \\ a21 & a22 & a23 & a24 & a25 & a26 & a27 & a28 & a29 \\ a31 & a32 & a33 & a34 & a35 & a36 & a37 & a38 & a39 \end{bmatrix} \quad (1)$$

The color conversion unit 106 makes color conversion by optimizing coefficient M given by equation (1) so as to express specific colors by target colors. In this case, the specific colors describe the color values of the boundary of the input gamut, and mapping destinations of the color values are described as target colors, so as to prevent the color values after conversion falling outside the output gamut, as has been described above.

The color conversion unit 106 acquires target color Jab values (to be referred to as "Jabd" hereinafter) obtained by the color conversion parameter selection unit 105 in step S5 in FIG. 5 (S603), and initializes respective elements aij (i=1 to 3, j=1 to 9) of coefficient M by appropriate values (S604). Next, the color conversion unit 106 multiplies a secondary combined vector of RGBs by coefficient M to calculate RGB values RGBs' after color conversion (S605):

$$\begin{bmatrix} Rs' \\ Gs' \\ Bs' \end{bmatrix} = M \begin{bmatrix} Rs^2 & Gs^2 & Bs^2 & RG & GB & BR & Rs & Gs & Bs \end{bmatrix}^T \quad (2)$$

where
Rs, Gs, and Bs are RGBs color values,
Rs', Gs', and Bs' are RGBs' color values,
RG=RsGs, GB=GsBs, and BR=BsRs, and
T is the transposed matrix.

If the RGBs' color values include a value less than 0 or equal to or larger than 256, the color conversion unit 106 replaces that value by 0 or 255 (S606), and calculates color appearance space values Jabs' of the output device for RGBs' based on the output gamut data and tetrahedron interpolation (to be described later) (S607).

Next, the color conversion unit 106 calculates a sum ΔE of three-dimensional distances between Jabs' and the target values Jabd (S608) by:

$$\Delta E = \Sigma_{i=1}^{Np} \sqrt{\{(Jsi'-Jdi)^2 + (asi'-adi)^2 + (bsi'-bdi)^2\}} \quad (3)$$

where
Jsi', asi', and bsi' are the J, a, and b values of the i-th Jabs',
Jdi, adi, and bdi are the J, a, and b values of the i-th Jabd, and
Np is the total number of specific colors.

The color conversion unit 106 checks if ΔE satisfies an optimization end condition of coefficient M (S609). That is, the color conversion unit 106 compares ΔE with a predetermined threshold ΔEth of the sum of the three-dimensional distances. If ΔE<ΔEth (YES in S609), the color conversion unit 106 determines that coefficient M is optimized within a desired allowable range, and the process advances to step S611. However, if ΔE≧ΔEth (NO in S609), the color conversion unit 106 determines that optimization is insufficient, and updates coefficient M to be an optimum solution (S610). The process then returns to step S605. Updating of coefficient M uses optimization schemes such as a mathematical scheme, search scheme, Pointer, multi-purpose optimization, and the like.

If coefficient M is optimized, the color conversion unit 106 loads the image data of the input image obtained in step S2 in FIG. 5 into the buffer memory 112 (S611). The color conversion unit 106 multiplies respective pixel values of the loaded image data by coefficient M to calculate device color values after conversion (S612), and outputs the image data after conversion (S613).

Calculation Method of Color Appearance Space Value by Tetrahedron Interpolation

Figure 12:
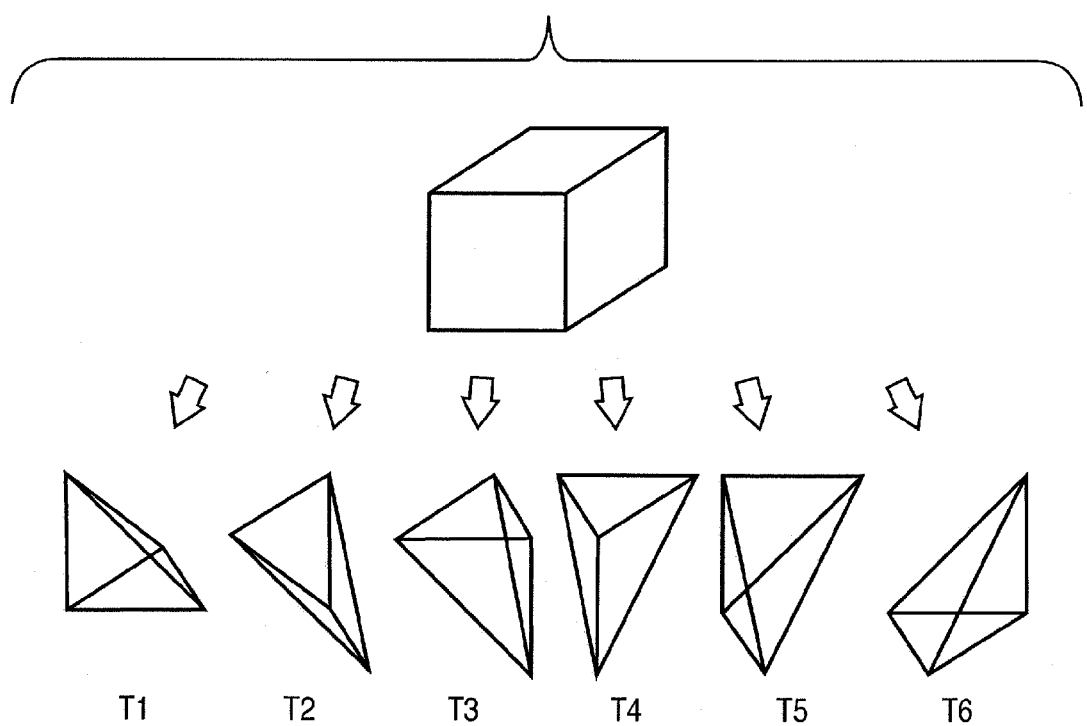
FIG. 12 illustrates a method of calculating color appearance space values from device color values using tetrahedron interpolation.
Figure 13:
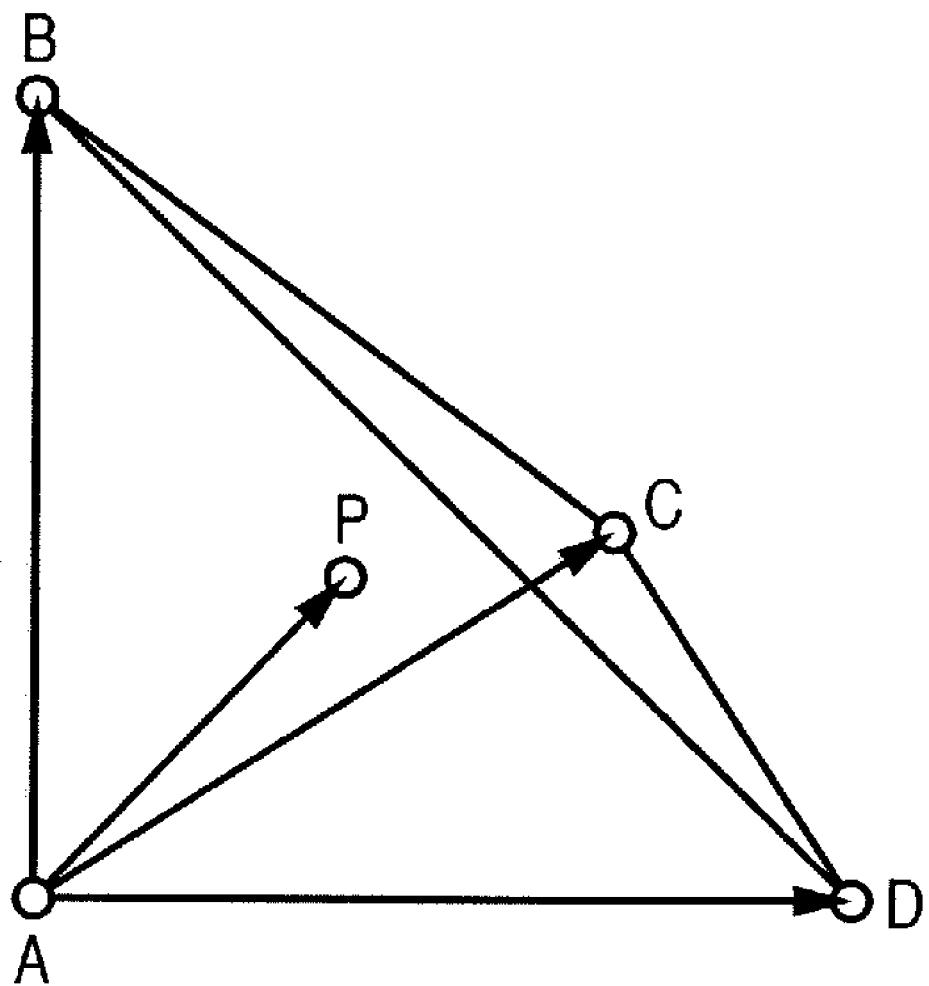
FIG. 13 illustrates a method of calculating color appearance space values from device color values using tetrahedron interpolation.

FIGS. 12 and 13 illustrate calculating the color appearance space values from the device color values using tetrahedron interpolation.

Device color values Rp, Gp, and Bp of point P are input to search for a color conversion table, which describes correspondence between the RGB values and Jab values, for a hexahedron that includes the RGBp values of input point P. Upon detection of the corresponding hexahedron, that hexahedron is divided into six tetrahedrons T1 to T6 shown in FIG. 12.

A tetrahedron which has points A, B, C, and D as vertices, as shown in FIG. 13 will be examined. If point P is included in tetrahedron ABCD, following formulas (4) to (6) hold at the same time:

$$\vec{AP} = s\vec{AB} + t\vec{AC} + u\vec{AD} \quad (4)$$

$$s+t+u \leq 1 \quad (5)$$

$$s \geq 0, t \geq 0, u \geq 0 \quad (6)$$

where, for example, AP is a vector from point A to point P.

In order to find a tetrahedron that includes input point P from the divided tetrahedrons, the color values RGBp of input point P and color values RGBa, RGBb, RGBC, and RGBd corresponding to vertices A, B, C, and D are substituted in equation (4) to obtain:

$$Rp-Ra = s(Rb-Ra) + t(Rc-Ra) + u(Rd-Ra)$$

$$Gp-Ga = s(Gb-Ga) + t(Gc-Ga) + u(Gd-Ga)$$

$$Bp-Ba = s(Bb-Ba) + t(Bc-Ba) + u(Bd-Ba) \quad (7)$$

Furthermore, s, t, and u are calculated from equation (8) obtained by modifying equations (7):

$$\begin{bmatrix} s \\ t \\ u \end{bmatrix} = \begin{bmatrix} Rb - RaRc - RaRd - Ra \\ Gb - GaGc - GaGd - Ga \\ Bb - BaBc - BaBd - Ba \end{bmatrix} \begin{bmatrix} Rp - Ra \\ Gp - Ga \\ Bp - Ba \end{bmatrix} \quad (8)$$

At this time, if s, t, and u satisfy inequalities (5) and (6), it is determined that input point P is located within tetrahedron ABCD.

That is, using Jab values Jaba, Jabb, Jabc, and Jabd corresponding to the respective vertices of tetrahedron ABCD for which s, t, and u satisfy the above conditions, Jab values Jabp of input point P can be calculated using:

$$Jp = Ja + s(Jb-Ja) + t(Jc-Ja) + u(Jd-Ja)$$

$$ap = aa + s(ab-aa) + t(ac-aa) + u(ad-aa)$$

$$bp = ba + s(bb-ba) + t(bc-ba) + u(bd-ba) \quad (9)$$

In this way, in step S607 the color conversion unit 106 calculates the Jab values Jabs' corresponding to the device color values RGBs' using tetrahedron interpolation.

As described above, the color conversion unit 106 converts respective pixel values into device color values of the output device by multiplying the respective pixel values of the input image data by coefficient M optimized to reproduce the specific colors by the target colors. In this case, since the target colors are switched in correspondence with the viewing light source input by the user, gamut mapping corresponding to various viewing conditions can be implemented.

Second Embodiment

Image processing according to the second embodiment of the present invention will be described hereinafter. Note that the same reference numerals in the second embodiment denote the same components as in the first embodiment, and a detailed description thereof will not be repeated.

[Arrangement of Color Conversion Apparatus]

Figure 14:
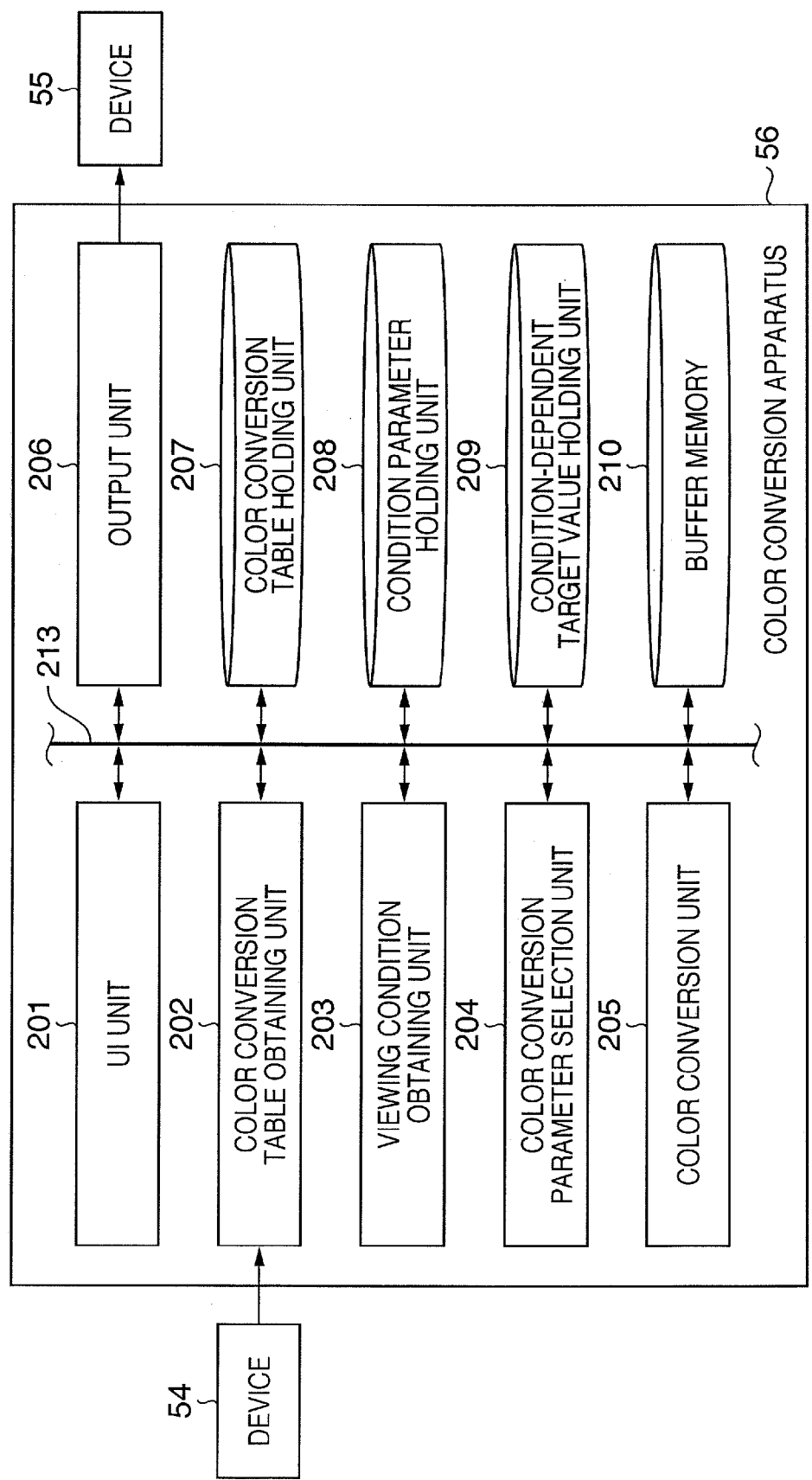
FIG. 14 is a block diagram showing an exemplary arrangement of a color conversion apparatus.

FIG. 14 is a block diagram showing an arrangement of a color conversion apparatus 56 of the second embodiment.

A user interface (UI) unit 201 inputs user's instructions. A color conversion table obtaining unit 202 obtains a color conversion table from a device 54, and stores it in a color conversion table holding unit 207. A viewing condition obtaining unit 203 obtains a viewing condition of an output image, and stores it in a condition parameter holding unit 208. A color conversion parameter selection unit 204 selects target colors corresponding to the current viewing condition from a condition-dependent target value holding unit 209 which holds target values for respective viewing conditions. A color conversion unit 205 corrects Jab values and the like corresponding to specific colors of the color conversion table stored in the color conversion table holding unit 207 based on the selected target colors. An output unit 206 outputs the color conversion table after color correction to a device 55.

A buffer memory 210 temporarily holds data in the middle of arithmetic operations, and may include a high-speed memory such as a RAM or the like. The color conversion table holding unit 207, condition parameter holding unit 208, and condition-dependent target value holding unit 209 can be assigned to respective areas on a nonvolatile hard disk. The buffer memory 210 may be assigned to the hard disk.

The aforementioned components are connected to each other via a system bus 213. The devices 54 and 55 comprise image processing devices, or devices such as a digital still camera, digital video camera, image scanner, film scanner, monitor, projector, printer, film recorder, and the like, which have a color processing function. Note that the devices 54 and 55, and the color conversion apparatus 56 are connected via a network or a general-purpose interface (e.g., USB or IEEE1394). The devices 54 and 55 may be a single device. In this case, the color conversion apparatus 56 obtains a color conversion table from a given device, and returns the color conversion table after color correction to that device.

Figure 15:
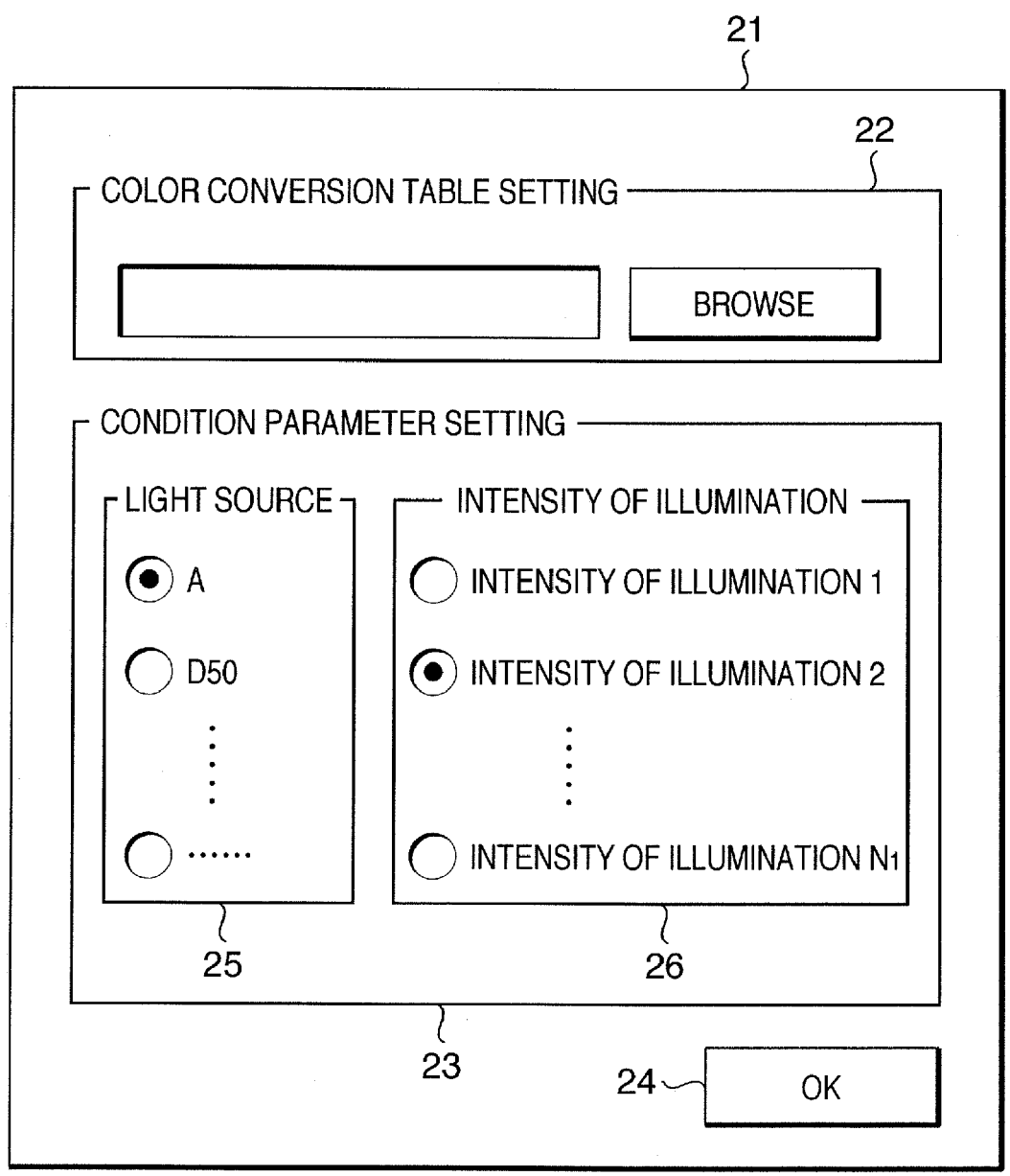
FIG. 15 shows an example of a user interface provided by a UI unit.

FIG. 15 shows an example of a user interface 21 provided by the UI unit 201.

The UI unit 201 displays a user interface exemplified in FIG. 15 on a monitor (not shown), and inputs instructions by the user who operates a keyboard and mouse (not shown).

The user sets a file name of a color conversion table in a color conversion table setting field 22. Also, the user sets a condition parameter using a condition parameter setting area 23. FIG. 15 shows an example wherein the user selects the viewing light source of an output image from a light source selection area 25, and selects the intensity of illumination of the light source used to view the output image from an intensity of illumination selection area 26. Upon completion of the settings, the user presses an OK button 24 to input a setting end message to the UI unit 201.

[Operation of Color Conversion Apparatus]

Figure 16:
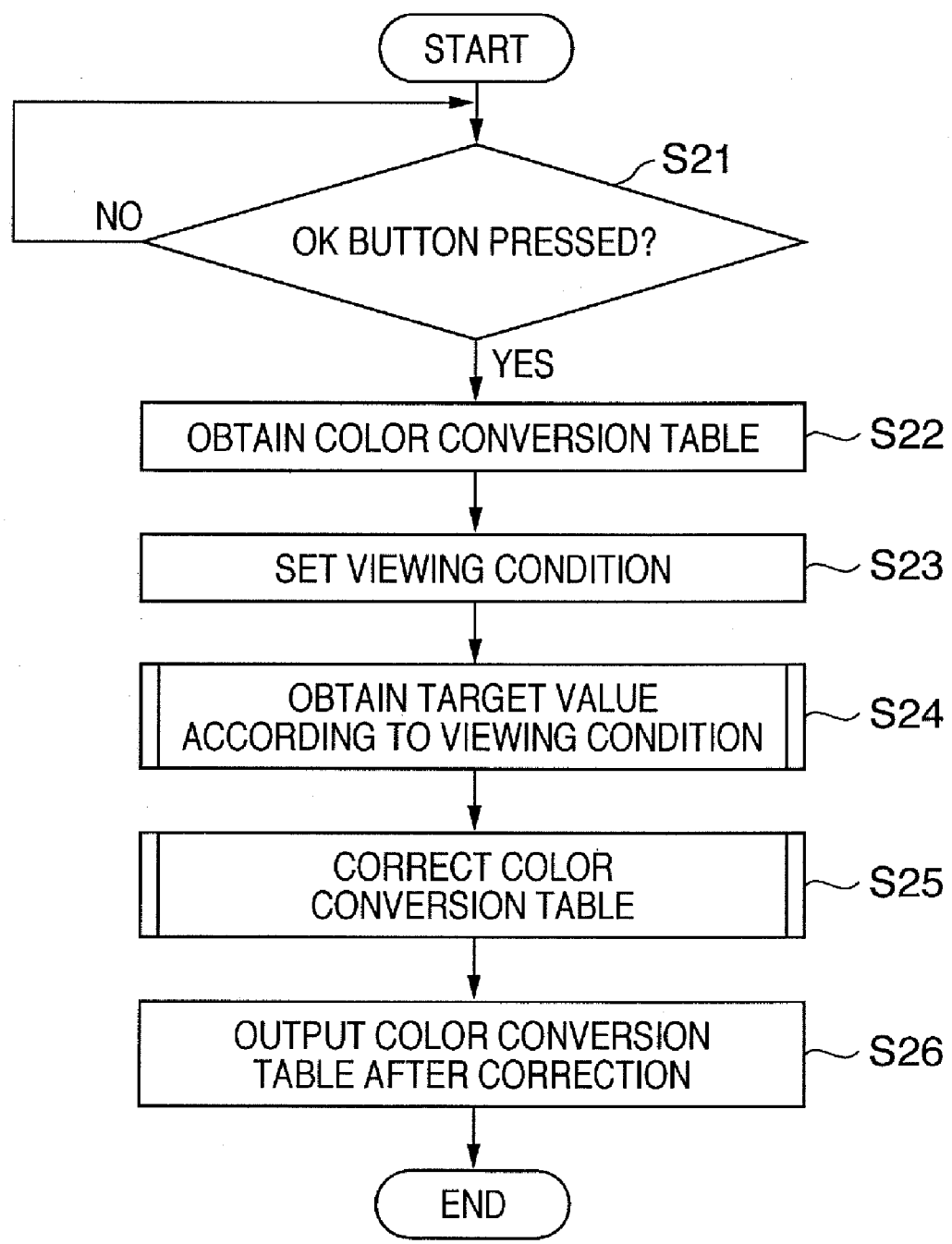
FIG. 16 is a flowchart showing color processing to be executed by the color conversion apparatus.

FIG. 16 is a flowchart showing color processing to be executed by the color conversion apparatus 56.

Figure 1:
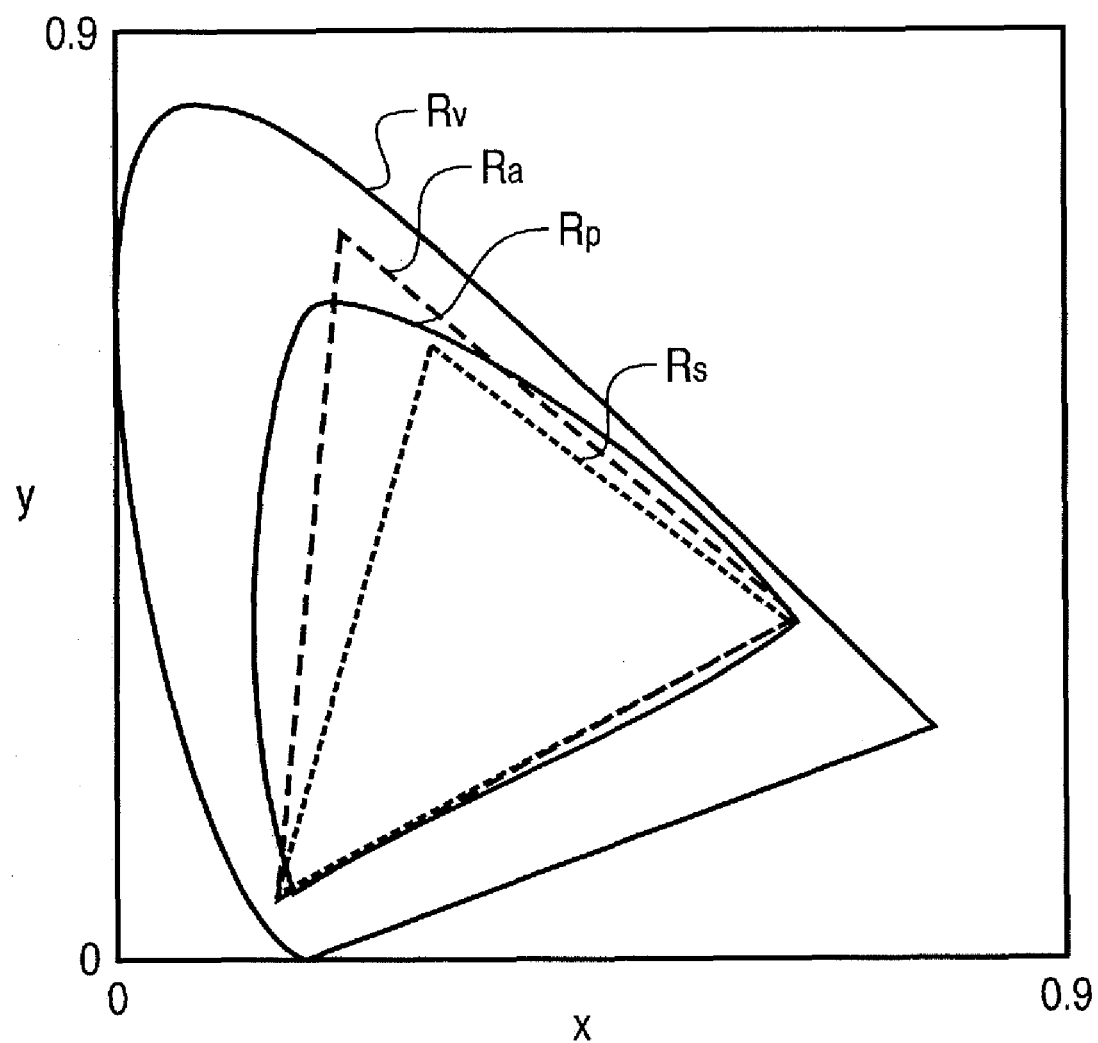
FIG. 1 is an xy chromaticity diagram showing the color gamuts of sRGB and AdobeRGB.
Figure 2:
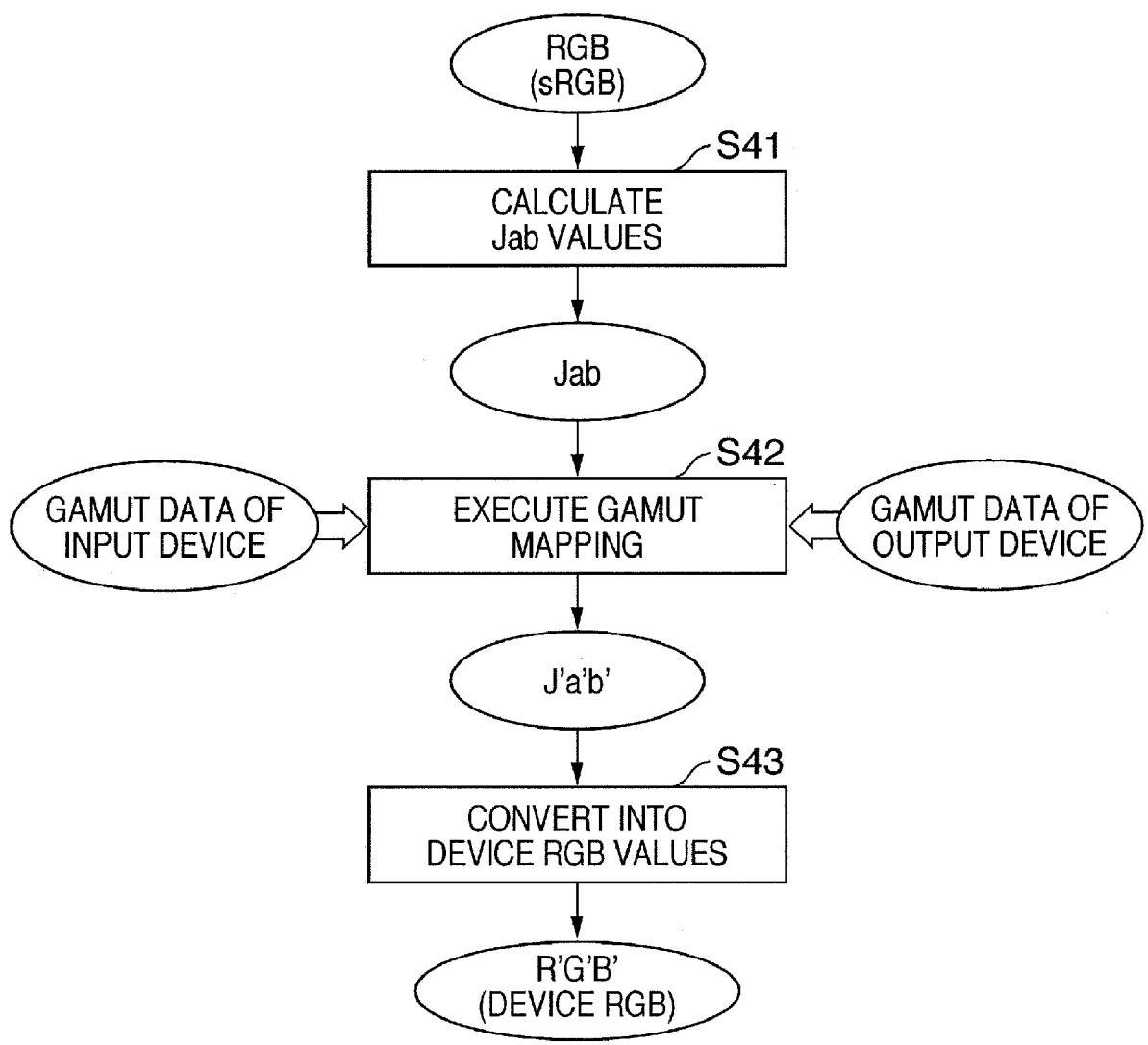
FIG. 2 is a flowchart of general gamut mapping.

It is checked if the user has pressed the OK button 24 on the user interface 21 (S21). If the user has pressed the OK button 24 (YES in S21), the color conversion table obtaining unit 202 obtains a color conversion table with the file name set in the color conversion table setting field 22 from the device 54, and stores it in the color conversion table holding unit 207 (S22). The color conversion table is a table for processing of converting device RGB values into J'a'b' values in FIG. 2, and its creation method will be described later.

The viewing condition obtaining unit 203 sets the viewing condition of the output image corresponding to that set on the condition parameter setting area 23 in the condition parameter holding unit 208 (S23). For example, the viewing condition obtaining unit 203 holds a correspondence table of light source numbers corresponding to combinations of light source names and intensities of illumination, as shown in FIG. 17. When the user selects D50 and 100 lx (intensity of illumination), the viewing condition obtaining unit 203 sets light source number 2 corresponding to that combination in the condition parameter holding unit 208.

The color conversion parameter selection unit 204 obtains target values corresponding to the input and output gamuts and the viewing condition from the condition parameter holding unit 208 (S24), as will be described in detail later. The color conversion unit 205 rewrites the Jab values of the color conversion table stored in the color conversion table holding unit 207 based on mapping from specific colors to target colors to correct the color conversion table (S25), as will be described in detail later. The output unit 206 then outputs the color conversion table after correction, which is stored in the color conversion table holding unit 207 to the device 55 (S26).

[Creation Method of Color Conversion Table]

The color conversion table is a correspondence table which describes the correspondence between the device RGB values of an input device, and J'a'b' values after the Jab values of these RGB values are mapped onto the output gamut. The mapping uses gamut mapping that maintains tones. As the gamut mapping that maintains tones, a method of determining the relationship between the input color values and input gamut, and that between the input gamut and output gamut, and converting the input color values into color values on the output gamut is known.

Figure 18:
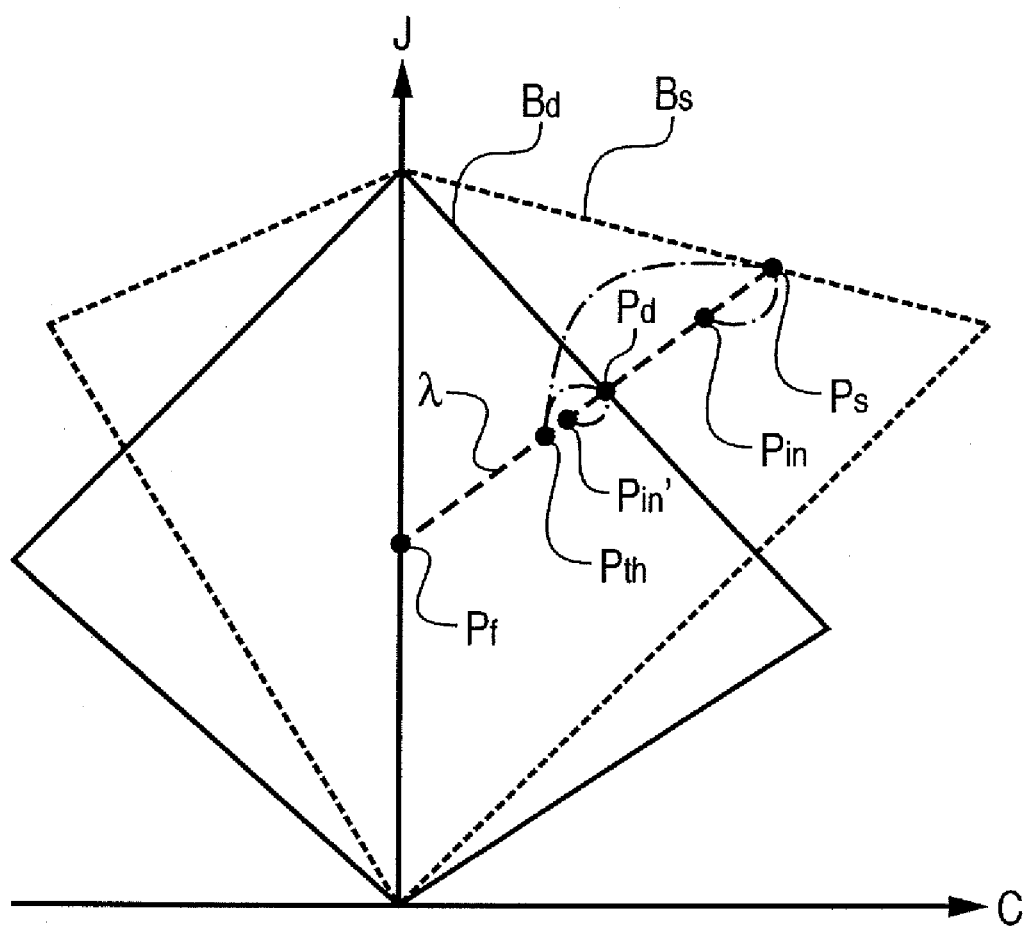
FIG. 18 shows an exemplary mapping state of an input color.

FIG. 18 shows the mapping state of an input color. In FIG. 18, Bs is the input gamut, Bd is the output gamut, and Pin is an input color. A line segment λ that connects a given point Pf (e.g., a point of lightness J=50) in the output gamut Bd and the input color Pin is considered, and a point Pin' which meets relation (10) below is defined as a mapping destination of the input color Pin:

$$|PsPth|:|PsPin|=|PsPth|:|PdPin'| \qquad (10)$$

where Pth is a point which meets PfPth=k·PfPd, and constant k=0 to 1.0.

If k=0.8, the color gamut of 80% between Pf and Pd is maintained, and the remaining color gamut of 20%, i.e., color values between Pth and Ps are mapped onto a range between Pth and Pd while maintaining tones.

[Color Conversion Parameter Selection Unit]

Figure 19:
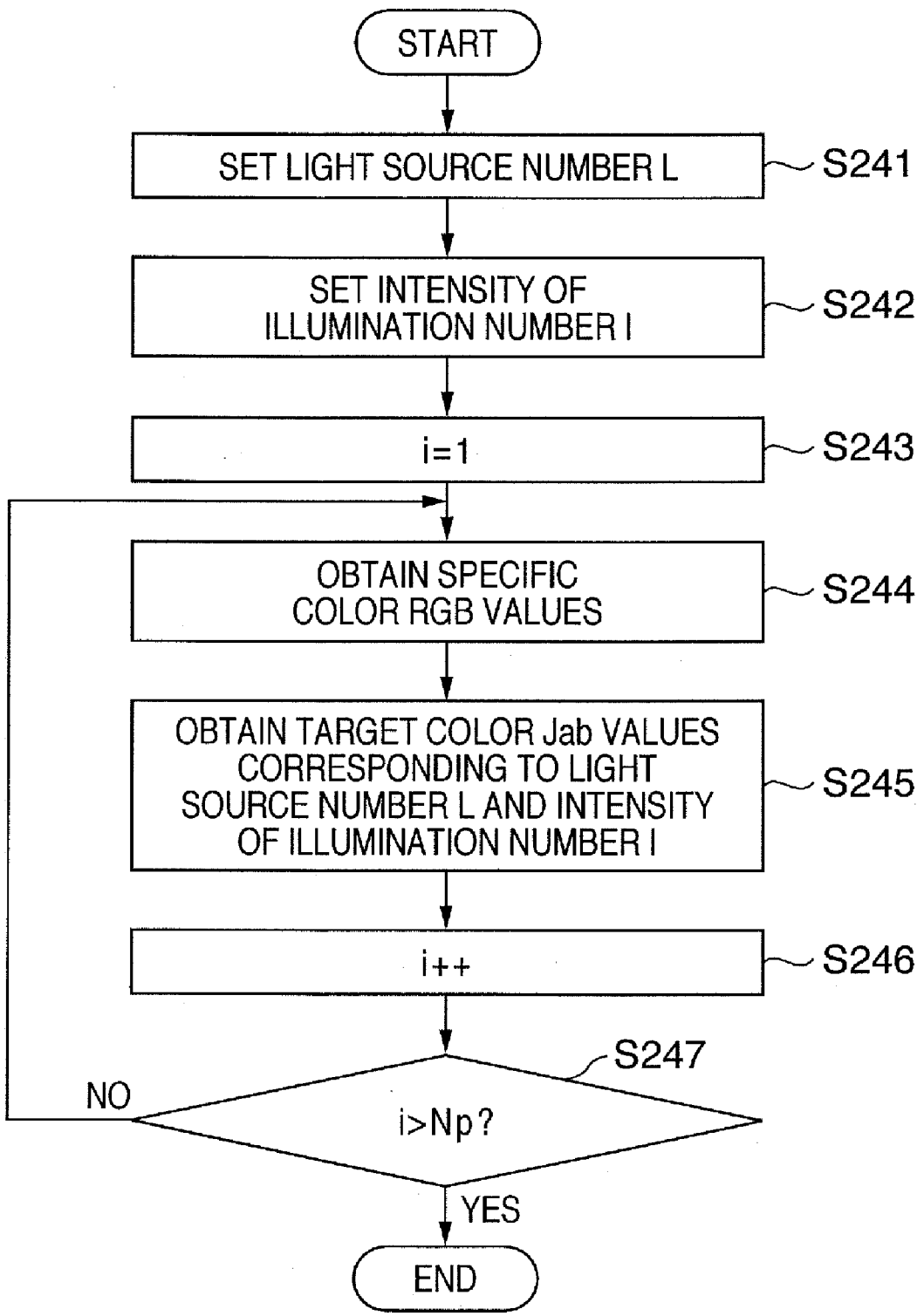
FIG. 19 is a flowchart showing processing of a color conversion parameter selection unit.

FIG. 19 is a flowchart showing the processing (S24) of the color conversion parameter selection unit 204.

The color conversion parameter selection unit 204 sets light source number L (S241) and intensity of illumination number I (S242) based on the number (see FIG. 17) indicating the combination of the light source and intensity of illumination, which is stored in the condition parameter holding unit 208. That is, the color conversion parameter selection unit 204 includes a table indicating light source number L and intensity of illumination number I, which corresponds to a number indicating the combination of the light source and intensity of illumination. The color conversion parameter selection unit 204 then resets counter i to "1" (S243). The color conversion parameter selection unit 204 obtains specific color RGB values (S244) and target color Jab values (S245) from a row with index number i of a target value table (to be described later) in the condition-dependent target value holding unit 209.

FIG. 20 shows an example of the target value table. An index number indicates the number of a specific color, and a maximum value Np of the index number corresponds to the number of specific colors. Each row of the target value table stores specific color RGB values and target color Jab values corresponding to light source number L and intensity of illumination number I. The target value table is stored in the condition-dependent target value holding unit 209 in correspondence with the input gamut and output gamut. Therefore, the color conversion parameter selection unit 204 selects a target value table corresponding to information indicating the color gamuts recorded in, e.g., the headers of the input gamut data and output gamut data, and obtains specific color RGB values and target color Jab values. Note that the information of each of the input and output gamuts is not limited to that recorded in the header of each of the input and output gamut data. For example, such information may be directly obtained from the devices 54 and 55 connected to the color conversion apparatus 56, or the user may select or set that information via the user interface 21 shown in FIG. 15. Note that the target value table describes the color values of the boundary of the input gamut as specific colors, and mapping destinations of these color values as target colors so as to prevent color values after color conversion by the color conversion unit 205 (to be described later) from falling outside the output gamut.

The color conversion parameter selection unit 204 increments counter i (S246) and checks if RGB values and target color Jab values corresponding to light source number L and intensity of illumination number I are obtained for all specific colors (S247). That is, the color conversion parameter selection unit 204 compares the value of counter i with the total number Np of specific colors. If i≦Np (NO in S247), the color conversion parameter selection unit 204 determines that specific colors to be obtained still remain, and the process returns to step S244. If i>Np (YES in S247), the color conversion parameter selection unit 204 determines that obtaining associated with all specific colors is complete.

[Color Conversion Unit]

The color conversion unit 205 rewrites the Jab values of specific colors in the color conversion table stored in the color conversion table holding unit 207 by target color Jab values so as to reproduce the specific colors by the target colors. However, with this processing alone, tonality deteriorates around the specific colors. Hence, in order to maintain tonality and to reproduce the specific colors by the target colors, a correction range is assured in a region including the specific colors and target colors, and the Jab values of colors within that correction range are changed when the specific color Jab values are changed, thus preventing deterioration of tonality.

Figure 21:
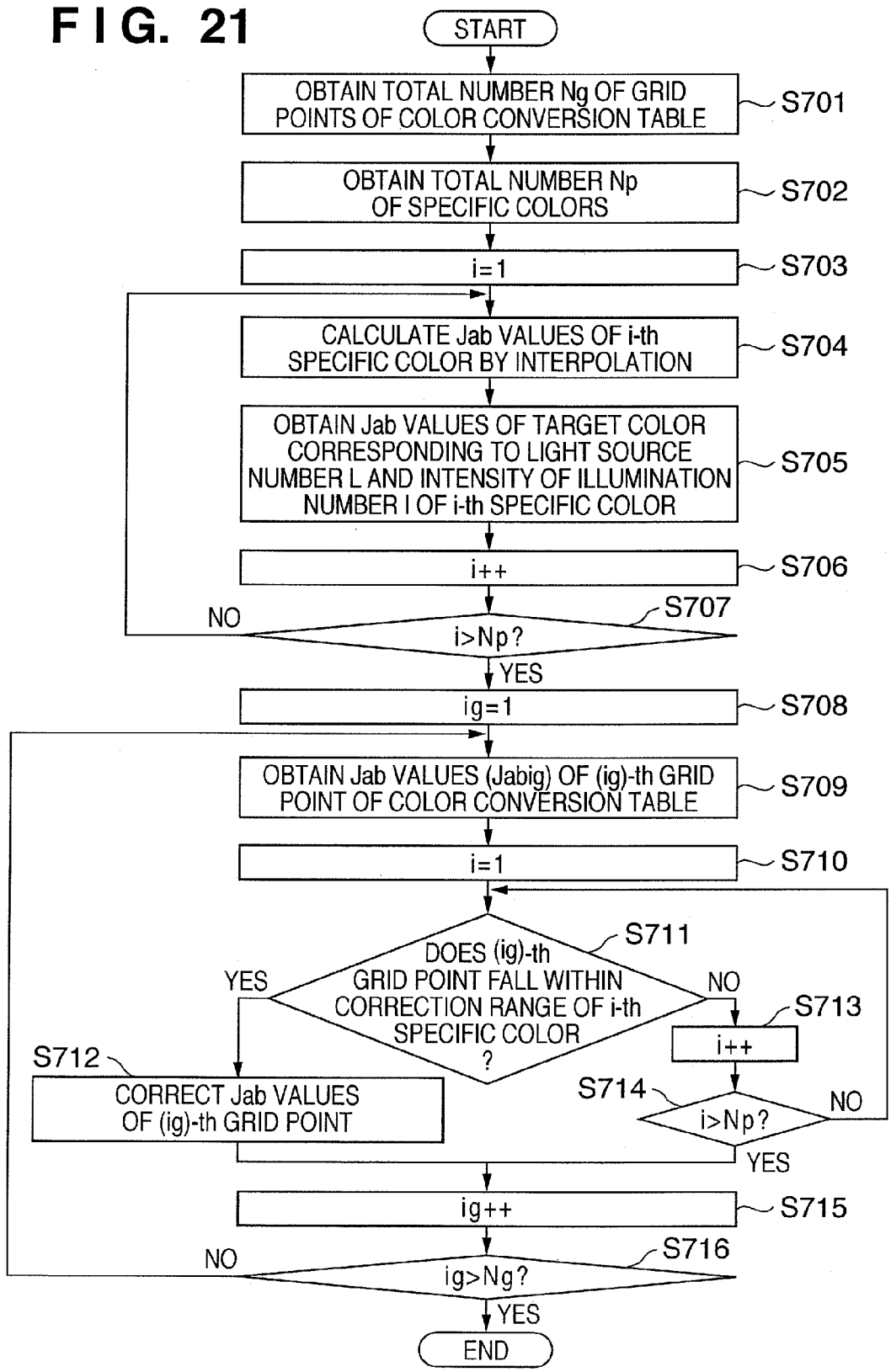
FIG. 21 is a flowchart showing processing of a color conversion unit.

FIG. 21 is a flowchart showing processing of the color conversion unit 205.

The color conversion unit 205 obtains the total number Ng of grid points of the color conversion table stored in the color conversion table holding unit 207 (S701) and also obtains the total number Np of specific colors (S702). The color conversion unit 205 then resets counter i to "1" (S703).

The color conversion unit 205 calculates Jab values (Jabs) corresponding to the RGB values of the i-th specific color by tetrahedron interpolation (S704). Since the method of calculating the Jab values from the RGB values using the tetrahedron interpolation has already been described in the first embodiment, a description thereof will not be repeated.

The color conversion unit 205 obtains target color Jab values (Jabd) corresponding to light source number L and intensity of illumination number I of the i-th specific color (S705). The color conversion unit 205 increments counter i (S706) and checks if the Jabs values and Jabd values corresponding to all the specific colors are obtained (S707). The color conversion unit 205 compares the total number Np of specific colors and the count value of counter i in this checking process. If i≦Np (NO in S707), the color conversion unit 205 determines that specific colors to be obtained still remain, and the process returns to step S704. If i>Np (YES in S707), the color conversion unit 205 determines that all the specific colors have been obtained, and the process advances to step S708.

The color conversion unit 205 resets counter ig to "1" (S708), and obtains Jab values (Jabig) of the (ig)-th grid point in the color conversion table (S709). The color conversion unit 205 resets counter i to "1" (S710), and checks if the Jabig values of the (ig)-th grid point fall within the range in which they are to be corrected in association with the i-th specific color (S711).

Figure 22:
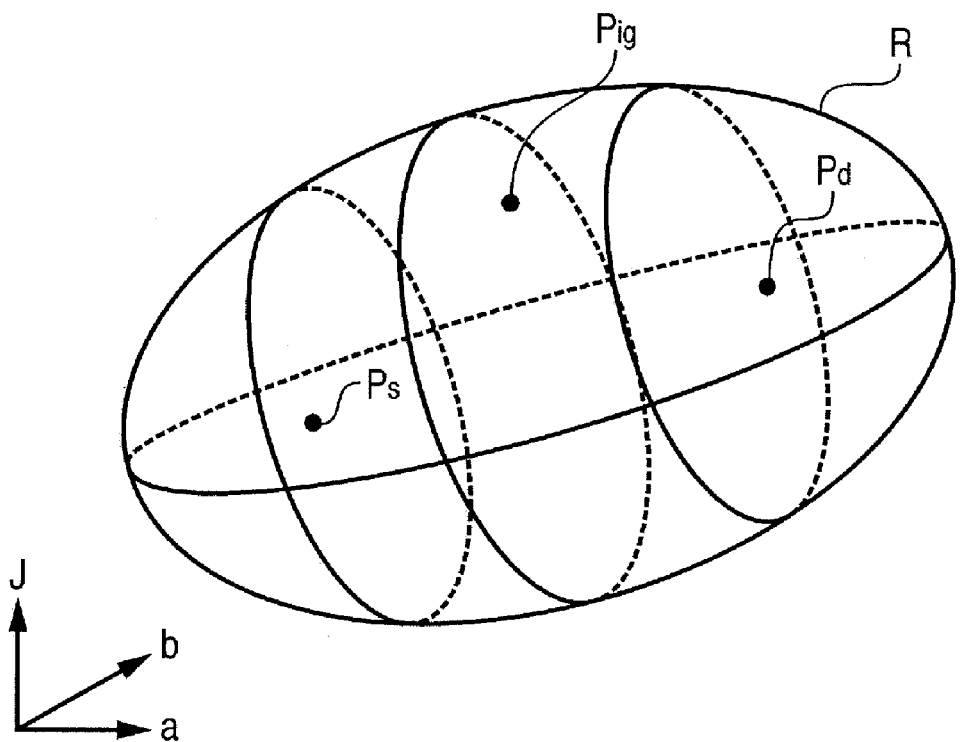
FIGS. 22 and 23 illustrate a method (inside/output determination method) of determining whether or not Jabig values of a grid point fall within a range in which the values are to be corrected.
Figure 23:
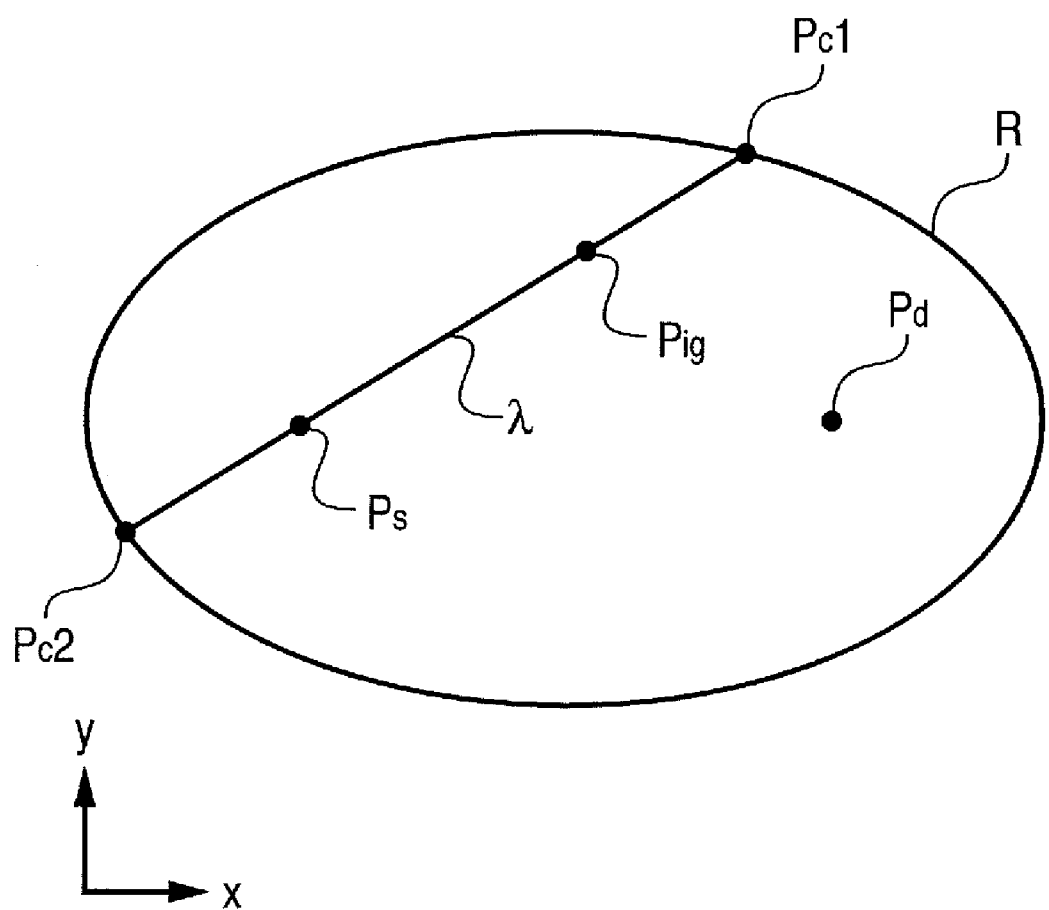

FIGS. 22 and 23 illustrate a method of checking if the Jabig values of a grid point fall within the range in which the values are to be corrected (to be referred to as "inside/outside determination" hereinafter). FIG. 22 shows the i-th specific color Ps on the Jab space, the i-th target color Pd, a range in which values are to be corrected (to be referred to as "correction range" hereinafter) R, and the (ig)-th grid point Pig of the conversion table. Assume that the correction range R is specified by an ellipsoid which has the points Ps and Pd as focal points.

In the following description, for the sake of simplicity, coordinate transformation is made so that a straight line that passes through the focal points Ps and Pd is parallel to the a-axis, and a plane including the focal points Ps and Pd and the grid point Pig is parallel to the ab plane. Then, by applying inverse transformation after a mapping destination Pig' of the point Pig is calculated, a mapping destination on the original coordinate system is calculated. Therefore, the focal points Ps and Pd, grid point Pig, and correction range R are transformed onto a two-dimensional xy coordinate system shown in FIG. 23.

In FIG. 23, inside/outside determination of the grid point Pig is made as follows.

Intersections Pc1 and Pc2 between the ellipsoid R and a straight line λ which passes through the grid point Pig and focal point Ps and is given by equation (11) below are calculated.

$$a_\lambda \cdot x + b_\lambda \cdot y + c_\lambda = 0 \qquad (11)$$

For
$a_\lambda = yig - ys$
$b_\lambda = xs - xig$
$c_\lambda = xig \cdot ys - xs \cdot yig$ where xs and ys are the x- and y-coordinates of the focal point Ps, and xig and yig are the x- and y-coordinates of the grid point Pig.

The ellipsoid (correction range) R is given by:

$$x^2/ar^2 + y^2/br^2 = 1 \qquad (12)$$

where 2·ar is the minor axis, and
2·br is the major axis.

From equations (11) and (12), the intersections Pc1 and Pc2 are given by:

$$Pc1 = -B + \sqrt{(B^2 - 4AC)}/2A$$

$$Pc2 = -B - \sqrt{(B^2 - 4AC)}/2A \qquad (13)$$

for
$A = br^2 b_\lambda^2 / ar^2 + (a_\lambda + b_\lambda)^2$
$B = 2 \cdot a_\lambda c_\lambda$
$C = c_\lambda^2 + br^2 b_\lambda^2 c_\lambda$ An angle θ vectors $\overrightarrow{PigPc1}$ and $\overrightarrow{PigPc2}$ make with each other is calculated by:

$$\theta = \cos^{-1}\{(\overrightarrow{PigPc1} \cdot \overrightarrow{PigPc2})/(|\overrightarrow{PigPc1}||\overrightarrow{PigPc2}|)\} \qquad (14)$$

When θ is 180°, since the grid point Pig is present on a line segment between the intersections Pc1 and Pc2, it is determined that the grid point Pig falls within the correction range. On the other hand, when θ is 0°, since the grid point Pig is not present on the line segment between the intersections Pc1 and Pc2, it is determined that the grid point Pig falls outside the correction range.

The color conversion unit 205 executes the above-described inside/outside determination. If it is determined that the grid point Pig falls outside the correction range (NO in S711), the color conversion unit 205 increments counter i (S713). The color conversion unit 205 compares counter i and the total number Np of specific colors (S714). If i≦Np (NO in S714), the process returns to step S711. If i>Np (YES in S714), the process advances to step S715.

If it is determined in step S711 that the grid point Pig falls within the correction range (YES in S711), the color conversion unit 205 calculates the mapping destination Pig' of the grid point Pig, and updates the Jab values (Jabig) of the (ig)-th grid point in the color conversion table to Pig' (S712). The process then advances to step S715.

The color conversion unit 205 increments counter ig (S715) and checks if processing is complete for all grid points in the color conversion table (S716). That is, the color conversion unit 205 compares counter ig and the total number Ng of grid points. If ig≦Ng (NO in S716), since the color conversion unit 205 determines that grid points to be processed still remain, the process returns to step S709. On the other hand, if ig>Ng (YES in S716), since the color conversion unit 205 determines that all the grid points have been processed, the color conversion processing ends.

Figure 24:
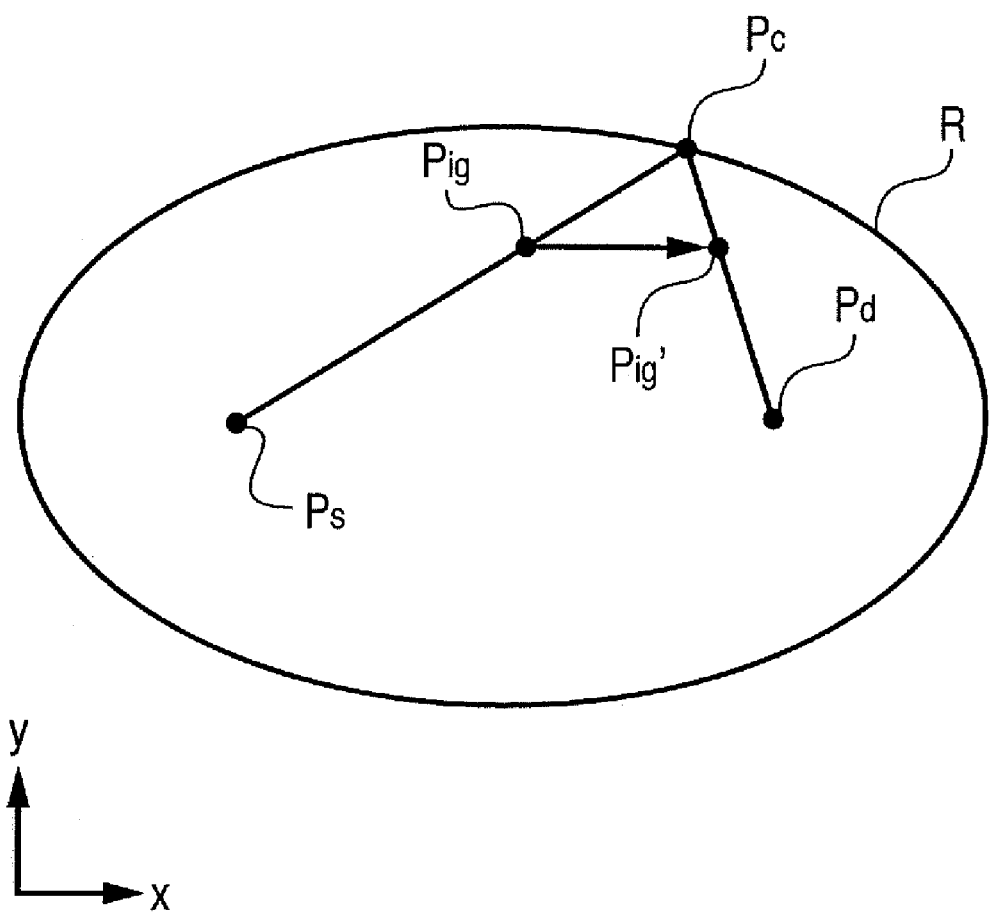
FIG. 24 illustrates a method of calculating a mapping destination Pig' of a point Pig.

FIG. 24 illustrates mapping destination Pig' of the grid point Pig.

The intersections Pc1 and Pc2 between the straight line that passes through the grid point Pig and focal point Ps and the correction range R are calculated as described above. Next, one of the intersections Pc1 and Pc2, which is closer to the grid point Pig, is defined as Pc (FIG. 24 shows an example in which the intersection Pc1 is closer to the grid point Pig). On a straight line which passes through Pc and the focal point Pd, a point which meets:

$$|PigPs|:|PigPc|=|Pig'Pd|:|Pig'Pc| \quad (15)$$

is defined as the mapping destination Pig'.
Therefore, Pig' can be expressed by:

$$Pig'=(|\overrightarrow{PigPc}|\overrightarrow{PigPc}+|\overrightarrow{PigPs}|\overrightarrow{PigPd})/(|\overrightarrow{PigPc}|+|\overrightarrow{PigPs}|) \quad (16)$$

With the above processing, the mapping destination Pig' of the grid point Pig is calculated, and the Jab values of the grid point Pig in the color conversion table are updated to Pig'.

As described above, in the color processing for converting the color signal values of a color image into color appearance space values of a different color gamut, a color conversion table which is created using a predetermined gamut mapping method is input. The user selects the light source and intensity of illumination used to view an output image, and the color conversion undergoes color correction while switching target colors of specific colors for each viewing light source and intensity of illumination. In this way, the color conversion table can be converted into the one which attains optimal gamut mapping independently of the viewing conditions.

Modification of Embodiments

The above embodiments have exemplified the case wherein the CIECAM02 color space is used. However, other color spaces such as CIECAM97s and the like which consider color appearance may be used.

In the above example, since the number of bits of each pixel value to be processed by the color conversion unit 106 is assumed to be 8 bits, the color value is clipped within the range from 0 to 255. However, the present invention is not limited to 8 bits. For example, in case of 16 bits, the color value may be clipped within the range from 0 to 65535.

In the above example, coefficient M to be processed by the color conversion unit 106 uses a secondary coefficient of 3 (rows)×9 (columns). However, a ternary coefficient of 3 (rows)×20 columns or a coefficient of 3 (rows)×3 (rows) may be used. Furthermore, the masking method need not be used. For example, the specific colors may be set to be reproduced by the target colors, and a color conversion table may be created by interpolation operations such as tetrahedron interpolation, spline interpolation, and the like.

An ellipse has been exemplified as the shape of the correction range R. However, polygons such as a hexagon, octagon, and the like, which include the specific colors and target colors may be used. Furthermore, any other shapes such as a circle, free closed curve, and the like may be used.

In the above example, equation (16) is used to convert a point in the correction range R. However, any other functions such as a spline curve, free curve, and the like may be used as long as they can smoothly maintain tones in the correction range R, and maintain a relative positional relationship between points before and after correction.

In the above example, the light source or the light source and intensity of illumination are used as the condition parameter. However, any other parameters may be used as long as they are external factors such as surrounding luminance, outside air temperature, and the like that influence colors to be perceived by human.

As the viewing condition, the light source information has been described in the first embodiment, and the light source information and intensity of illumination information have been described in the second embodiment. However, viewing conditions in a color appearance model such as light source information, intensity of illumination information, the distance between the object to be viewed and the viewer, colors and brightness around the object to be viewed, and the like can be added to viewing conditions required to select target values or target colors.

Exemplary Embodiments

The present invention can be applied to a system including a plurality of devices (e.g., host computer, interface, reader, printer) or to an apparatus having a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, and then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, an OS (operating system) or the like working on the computer can perform a part or entire processes in accordance with designations of the program code and realize functions according to the above embodiments.

Furthermore, the program code read from the storage medium can be written in a function expansion card, which is inserted into the computer or in a memory provided in a function expansion unit which is connected to the computer, CPU or the like contained in the function expansion card or unit, and perform a part or entire process in accordance with designations of the program code and realize functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-100387, filed Mar. 31, 2006, which is hereby incorporated by reference herein in its entirety.

What is claimed is:

1. A color processing method comprising:
using a processor to perform:
  inputting information indicating a viewing condition, an input gamut of an input device, and an output gamut of an output device;
  obtaining a color value of a specific color and a target value of the specific color on a color appearance space corresponding to the viewing condition from a table corresponding to the input gamut and the output gamut;
  setting a color processing coefficient required to convert the color value of the specific color into the target value;
  applying color processing to image data input from the input device using the color processing coefficient; and
  outputting the image data that has undergone the color processing to the output device.

2. The method according to claim 1, wherein the viewing condition includes light source information upon viewing an image output from the output device.

3. The method according to claim 1, wherein setting the color processing coefficient comprises:
  applying the color processing to the color value of the specific color using the color processing coefficient;
  calculating a value on the color appearance space in the output gamut corresponding to a result of the color processing; and
  setting the color processing coefficient so that a distance between the calculated value and the target value becomes less than a predetermined value.

4. The method according to claim 3, wherein setting a color processing coefficient repeats the setting of the color processing coefficient as many times as the number of specific colors.

5. A color processing apparatus comprising:
  an input section, arranged to input information indicating a viewing condition, an input gamut of an input device, and an output gamut of an output device;
  an obtaining section, arranged to obtain a color value of a specific color and a target value of the specific color on a color appearance space corresponding to the viewing condition from a table corresponding to the input gamut and the output gamut;
  a setting section, arranged to set a color processing coefficient required to convert the color value of the specific color into the target value;
  a color processor, arranged to apply color processing to image data input from the input device using the color processing coefficient; and
  an output section, arranged to output the image data that has undergone the color processing to the output device.

6. A non-transitory computer-readable storage medium storing a computer-executable program causing a computer to perform a color processing method, the method comprising:
  inputting information indicating a viewing condition, an input gamut of an input device, and an output gamut of an output device;
  obtaining a color value of a specific color and a target value of the specific color on a color appearance space corresponding to the viewing condition from a table corresponding to the input gamut and the output gamut;
  setting a color processing coefficient required to convert the color value of the specific color into the target value;
  applying color processing to image data input from the input device using the color processing coefficient; and
  outputting the image data that has undergone the color processing to the output device.

* * * * *